US012468738B2

(12) United States Patent
O'Hara et al.

(10) Patent No.: US 12,468,738 B2
(45) Date of Patent: *Nov. 11, 2025

(54) MULTIPLE MACHINE LEARNING MODEL ANOMALY DETECTION FRAMEWORK

(71) Applicant: Business Objects Software Ltd., Dublin (IE)

(72) Inventors: Paul O'Hara, Dublin (IE); Ying Wu, Maynooth (IE); Malte Christian Kaufmann, Dublin (IE)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,570

(22) Filed: Jun. 26, 2024

(65) Prior Publication Data
US 2025/0013668 A1 Jan. 9, 2025

Related U.S. Application Data

(63) Continuation of application No. 18/348,143, filed on Jul. 6, 2023, now Pat. No. 12,050,628.

(51) Int. Cl.
G06F 16/28 (2019.01)
G06F 16/23 (2019.01)

(52) U.S. Cl.
CPC ........ G06F 16/285 (2019.01); G06F 16/2365 (2019.01)

(58) Field of Classification Search
CPC ............................ G06F 16/285; G06F 16/2365
(Continued)

(56) References Cited

U.S. PATENT DOCUMENTS 10,742,482 B2 * 8/2020 Tellado ................. H04L 41/142
11,194,691 B2    12/2021 Dherange et al.
(Continued)

FOREIGN PATENT DOCUMENTS

WO    20200060544 A1    3/2020

OTHER PUBLICATIONS

Pu, Guo, et al., "A Hybrid Unsupervised Clustering-Based Anomaly Detection Method", Tsinghua Science and Technology, vol. 6, No. 2, Apr. 2021, pp. 146-153.*
Murphree, Jerry, "Machine Learning Anomaly Detection in Large Systems", Autest 2016, Anaheim, CA, Sep. 12-15, 2016, 9 pages.*
Yao, Haipeng, et al., "Chapter 3: Intelligent Network Awareness", Developing Networks using Artificial Intelligence, Springer Nature Switzerland AG © 2019, pp. 31-83.*
(Continued)

*Primary Examiner* — Robert Stevens
(74) *Attorney, Agent, or Firm* — Fountainhead Law Group, PC

(57) ABSTRACT

Anomalies may be detected using a multiple machine learning model anomaly detection framework. A clustering model is trained using an unsupervised machine learning algorithm on a historical anomaly dataset. A plurality of clusters of records are determined by applying the historical anomaly dataset to the clustering model. Then it is determined whether each cluster of the plurality of clusters is an anomaly-type cluster or a normal-type cluster. The plurality of labels for the plurality of records are updated based on the particular record's cluster classification. Non-pure clusters are determined from among the plurality of clusters based on a purity threshold. A supervised machine learning model is trained for each of the non-pure clusters using the records in the given cluster and the labels for each of those records. Then, predictions of an anomaly are made using the clustering model and the supervised machine learning models.

20 Claims, 14 Drawing Sheets

(58) Field of Classification Search
USPC .......................................................... 707/737
See application file for complete search history.

(56) References Cited

U.S. PATENT DOCUMENTS

| | | | | |
|---|---|---|---|---|
| 12,206,691 | B2* | 1/2025 | Kaul | ........................ G06N 20/10 |
| 2014/0074796 | A1* | 3/2014 | Akoglu | ................. G06F 21/566 |
| | | | | 707/687 |
| 2020/0210647 | A1* | 7/2020 | Panuganty | ................ G06N 3/08 |
| 2021/0264306 | A1 | 8/2021 | Baran Pouyan et al. | |
| 2022/0036137 | A1* | 2/2022 | Muselli | ............... G06F 18/2178 |
| 2022/0253699 | A1* | 8/2022 | Hoshen | .................... G06N 3/08 |
| 2022/0368696 | A1 | 11/2022 | Karpovsky et al. | |
| 2023/0195715 | A1 | 6/2023 | Johannes et al. | |
| 2023/0205193 | A1 | 6/2023 | Lavrentyev et al. | |
| 2023/0419402 | A1 | 12/2023 | Ghelichi et al. | |
| 2024/0152798 | A1* | 5/2024 | Karpovsky | ............. G06N 20/10 |

OTHER PUBLICATIONS

Ju, Hyunjun, et al., "PUMAD: Pu Metric learning for anomaly detection", Information Sciences, vol. 523, Jun. 2020, pp. 167-183.*

Ding, Xueying, et al., "From Explanation to Action: An End-to-End Human-in-the-Loop Framework for Anomaly Reasoning and Management", arXiv, Cornell University Archive, document: arXiv:2304.03368v1 [cs.LG], Apr. 6, 2023, 16 pages.*

Macha, Meghanath, et al., "Explaining anomalies in groups characterizing subspace rules", Data Mining and Knowledge Discovery, vol. 32, Springer Nature Link, Aug. 2018, pp. 1440-1480.*

Omar, Salima, et al., "Machine Learning Techniques for Anomaly Detection: An Overview", International Journal of Computer Applications, vol. 79, No. 2, Oct. 2013, pp. 33-41.

Baek, Sunhee, et al., "Clustering-based label estimation for network anomaly detection", Digital Communications and Networks, vol. 7, Issue 1, Feb. 2021, pp. 37-44.

* cited by examiner

MULTIPLE MACHINE LEARNING MODEL ANOMALY DETECTION FRAMEWORK

CROSS REFERENCE TO RELATED APPLICATIONS

The present application is a continuation of U.S. application Ser. No. 18/348,143 filed Jul. 6, 2023, and titled "MULTIPLE MACHINE LEARNING MODEL ANOMALY DETECTION FRAMEWORK," which is incorporated herein by reference for all purposes.

BACKGROUND

The present disclosure pertains to anomaly detection and in particular to anomaly detection using a combination of unsupervised machine learning and supervised machine learning.

Nowadays, the running of our society tightly depends on large-scale Information Technology (IT) infrastructures. IT infrastructure generally refers to the composition of IT components needed to support the activities and services to facilitate business functions. IT infrastructure may require operations and management of a wide range of hardware, software, services and network resources. Over the years, IT infrastructure has witnessed an increase in size and complexity. To handle all its processes, IT infrastructure may rely on an array of legacy systems, cloud applications, and software programs, and all these systems could be interconnected and work together. This brings challenges to IT operators to perform administration tasks manually. In recent years, this has motivated interest towards the research of self-managing and intelligent learning systems to improve reliability and efficiency of these systems and IT services. Artificial Intelligence for IT Operations (AIOps) is such an area which make use of Artificial Intelligence for the management and improvement of IT services. AIOps mainly relies on machine learning techniques to monitor IT infrastructure and facilitate complex management tasks such as failure prediction, anomaly detection and recommendation.

There is a need for improved machine learning techniques that use fewer computer processing resources and that provide a higher degree of accuracy. The present disclosure addresses these issue and others, as further described below.

DETAILED DESCRIPTION

Figure 1:
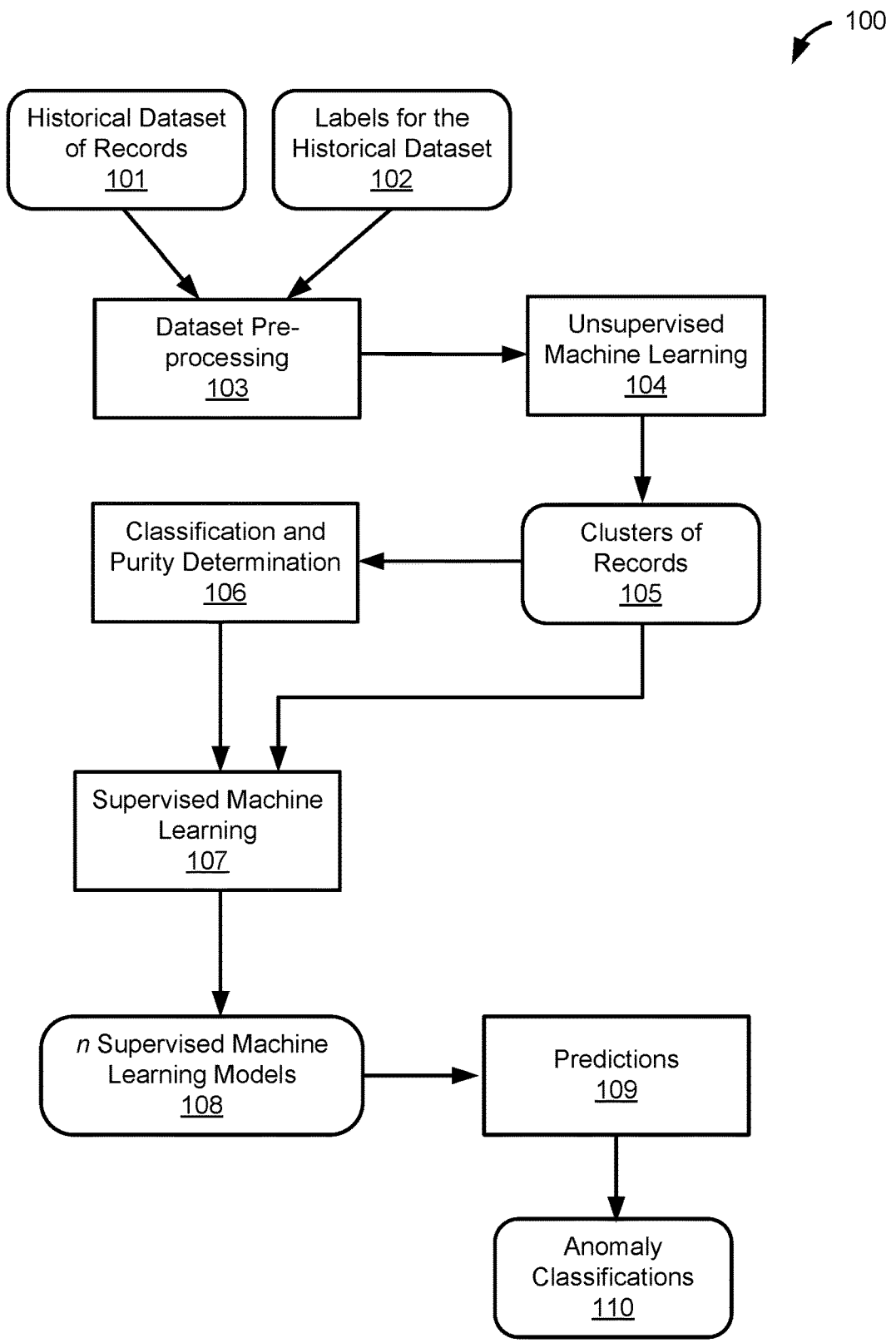
FIG. 1 shows a diagram of a multiple machine learning model Anomaly Detection Framework, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated. These terms, as used herein, may simply be used for differentiation between different objects or elements.

As mentioned above, IT infrastructure has witnessed an increase in size and complexity. To handle all its processes, IT infrastructure may rely on an array of legacy systems, cloud applications, and software programs, and all these systems could be interconnected and work together. This brings challenges to IT operators to perform administration tasks manually. In recent years, this has motivated interest towards the research of self-managing and intelligent learning systems to improve reliability and efficiency of these systems and IT services. Artificial Intelligence for IT Operations (AIOps) is such an area which make use of Artificial Intelligence for the management and improvement of IT services. AIOps mainly relies on machine learning techniques to monitor IT infrastructure and facilitate complex management tasks such as failure prediction, anomaly detection and recommendation.

One topic in AIOps is Anomaly Detection (AD). Anomaly Detection aims to identify outliers or rare events from data. Through anomaly detection, it is possible to determine the status of IT infrastructure at a time point. Moreover, further methodologies may be applied to predict the possibility of system failure in a future time where recommendations could be generated to IT operators or IT infrastructure could automatically handle the possible issues.

Generally, there are two main techniques to achieve anomaly detection for IT infrastructure are. One technique involves performing anomaly detection in a supervised-learning way. In this technique, when the IT monitoring records are associated with pre-defined labels and some of labels correspond to anomalous system situations, supervised learning algorithms can be directly considered as the pre-defined labels and can be easily converted into a target feature for supervised learning. In this case, classification or regression models can be trained where the metrics of system monitoring can be used as input features and the corresponding labels are regarded as target feature. A wide range of supervised learning algorithms can be considered, simply as a binary classification algorithm or complicatedly as deep learning techniques, or even time series analysis.

The other technique is to perform anomaly detection in an unsupervised-learning way. No labels are needed from the IT monitoring data, but normal behaviors can be captured, or the normal records can be separated away from the anomalous records by unsupervised learning algorithms. Unsupervised learning algorithms are performed to capture the difference between normal behaviors and anomalous behaviors, by which the anomalies can be identified.

In practice, there are several further considerations for anomaly detection in IT infrastructure.

One consideration is that anomaly detection in supervised-learning way could be more common in IT infrastructure. Detecting anomalies in unsupervised-learning way requires very little effort in labeling IT monitoring data. Unsupervised learning is useful when the volume of data is too large to label every record in time. However, when unsupervised learning algorithms are used for anomaly detection, the separation of normal cases and anomalous cases is mathematically based on pre-defined statistical criteria, instead of IT organization's criteria. As a result, the separation may not be suitable for the IT organization and in some cases the detected anomalies may not be regarded as anomalies by IT operators.

Another consideration is that the anomaly detection solution needs to be flexible enough to allow the IT Operators to label the IT monitoring data according to their demands. This is because different IT organizations could have different definitions of a normal and an anomalous status based on different criteria. This means even with the same IT monitoring data, the target, indicating the status of IT systems, could be different between IT operations.

Another consideration is that the IT monitoring data could contain a large amount of sparse information. This is because the IT infrastructure includes a wide range of hardware, software and systems. When monitoring the status of IT infrastructure, the status of many IT components may be represented by sparse discrete values. Such sparse information could impact the accuracy of anomaly detection, whichever supervised-learning way or unsupervised-learning way is used.

Another consideration is that the IT monitoring data usually have many records and includes a large number of features. Monitoring the IT infrastructure is usually a continuous process over a period of time. At the same time, an enormous number of IT components may need to be monitored, where each IT component could log countless rows of data. To get a reasonable accuracy of anomaly detection from such a dataset, advanced and powerful algorithms, for instance deep learning techniques, may be used. However, deep learning techniques may lead to long training time and increased used of computing resources.

There is a need for improved machine learning techniques that use fewer computer processing resources (e.g., compared to deep learning techniques) and that provide a higher degree of accuracy (e.g., accuracy close to that achieved by deep learning techniques). The present disclosure provides a multiple machine learning model Anomaly Detection Framework that addresses these issue and others, as further described below.

Based on the considerations above, an anomaly detection solution using an Anomaly Detection Framework is disclosed herein.

The Anomaly Detection Framework uses supervised-learning which allows IT operators to define their own anomalies. The Anomaly Detection Framework includes an unsupervised-learning component, named as "Unsupervised Feature Projection," by which the dimension of IT monitoring data can be reduced. The Anomaly Detection Framework includes an unsupervised-learning component, named as "Anomaly Cluster," which can efficiently organize records with similar behavior into the same group. This means the records with normal behaviors or anomalous behaviors may be grouped into the same cluster. It is possible that some normal records and anomalous records have similar behavior and are assigned to the same cluster. But by grouping, the anomalous records in the cluster could become more clear and get detected more efficiently. Within the "Anomaly Cluster" component the Anomaly Detection Framework uses an algorithm that utilizes the properties of each identified cluster to determine the type of data, anomaly or normal, it represents, enabling each cluster to be labelled as either representing anomaly or normal data, with the data assigned to each cluster subsequently labelled accordingly.

The Anomaly Detection Framework also includes a supervised-learning component with a special activating mechanism, named as "Anomaly Cluster Enhancement," to improve the accuracy of anomaly detection in some candidate clusters. The supervised-learning component may be activated when the normal behaviors and anomalous behaviors are very similar in the same cluster. This is advantageous as it means that the supervised-learning algorithm may not be performed on the whole dataset. Furthermore, the Anomaly Cluster Enhancement is performed based on the information produced by unsupervised-learning component with other statistical factors. Such information is gathered after processing the original data, where the anomalous behaviors become much more obvious. Experiments show the proposed supervised-learning component with the activating mechanism can greatly reduce the training time, increase accuracy, and minimize the overfitting.

Within the "Anomaly Cluster Enhancement" component, the Anomaly Detection Framework introduces an algorithm to represent the activation mechanism in determining the candidate clusters for accuracy enhancement. Through experiments, the Anomaly Detection Framework is expected to have the following advantages. The Anomaly Detection Framework provides a flexible way to allow the end users to have their own anomaly definition as demanded. The Anomaly Detection Framework is designed to use a pipeline of simple machine learning models to facilitate anomaly detection process. Specifically it makes use of unsupervised learning models to capture obvious anomalous behaviors where the majority of anomalies are detected and some simple supervised learning models are performed to detected anomalous behaviors that are more difficult to capture. This makes anomaly detection process performed more efficiently and generic with stable accuracy. Furthermore, the Anomaly Detection Framework can provide improved accuracy to detect anomalies whilst only simple machine learning models need to be trained and applied which thus requires simple implementation and low cost in practice.

An overview of the Anomaly Detection Framework is given below.

FIG. 1 shows a diagram of a multiple machine learning model Anomaly Detection Framework, according to an embodiment. The Anomaly Detection Framework uses both unsupervised machine learning 104 and supervised machine learning 107 to provide improved accuracy over certain other machine learning techniques while also consuming fewer computing resources compared to certain other machine learning techniques.

During a training phase, a historical dataset of records 101 is obtained along with labels 102 for the historical dataset. First, Data Pre-processing 103 is performed. In pre-processing 103, categorical features are identified, and one-hot encoded, for example. The output dataset then standardizes each feature to have mean 0 and variance 1, with the output standardized dataset proceeded to be used as input to learn an unsupervised feature projection model, which projects the dataset to dimensionality reduced dataset whilst maintaining most of the information of the standardized dataset. With pre-processing completed, the dimensionality reduced dataset is then utilized for the Anomaly Classification part of the framework.

The anomaly classification part begins with Unsupervised Machine Learning 104. This includes learning a clustering model, grouping the dimensionality input dataset into clusters of records 105 where data items (e.g., rows) identified as having similar features are assigned to the same cluster.

Then Classification and Purity Determination 106 is performed. An Anomaly Cluster Assignment Algorithm is applied to each cluster classifying each cluster, and related records assigned to the cluster, as either an anomaly or normal cluster. For each classified cluster, an Enhancement Candidate Cluster Identification Algorithm is applied determining if the cluster is pure or not based on a predetermined purity threshold, which determines if the cluster is a candidate cluster for accuracy enhancement. If the cluster is identified as an enhancement candidate cluster (e.g., based on the purity threshold), the associated classified dimensionality reduced dataset items, learned clustering model, associated input anomaly dataset items are processed producing for each cluster, a candidate cluster anomaly classification enhancement dataset.

Then, Supervised Machine Learning 107 is performed. Utilizing the candidate cluster anomaly classification enhancement dataset as input, a classification model is learned. This results in n Supervised Machine Learning Models 108, one model for each of the candidate clusters. Each of these models 108 can perform Predictions 109 classifying each candidate cluster anomaly classification enhancement data item as either an anomaly or normal.

Once all candidate clusters are processed, and predictions produced, the candidate cluster enhanced anomaly classifications are combined with anomaly classifications produced by untreated non-candidate clusters and the final output of Anomaly Classifications 110 for the input historical anomaly dataset produced.

Figure 2:
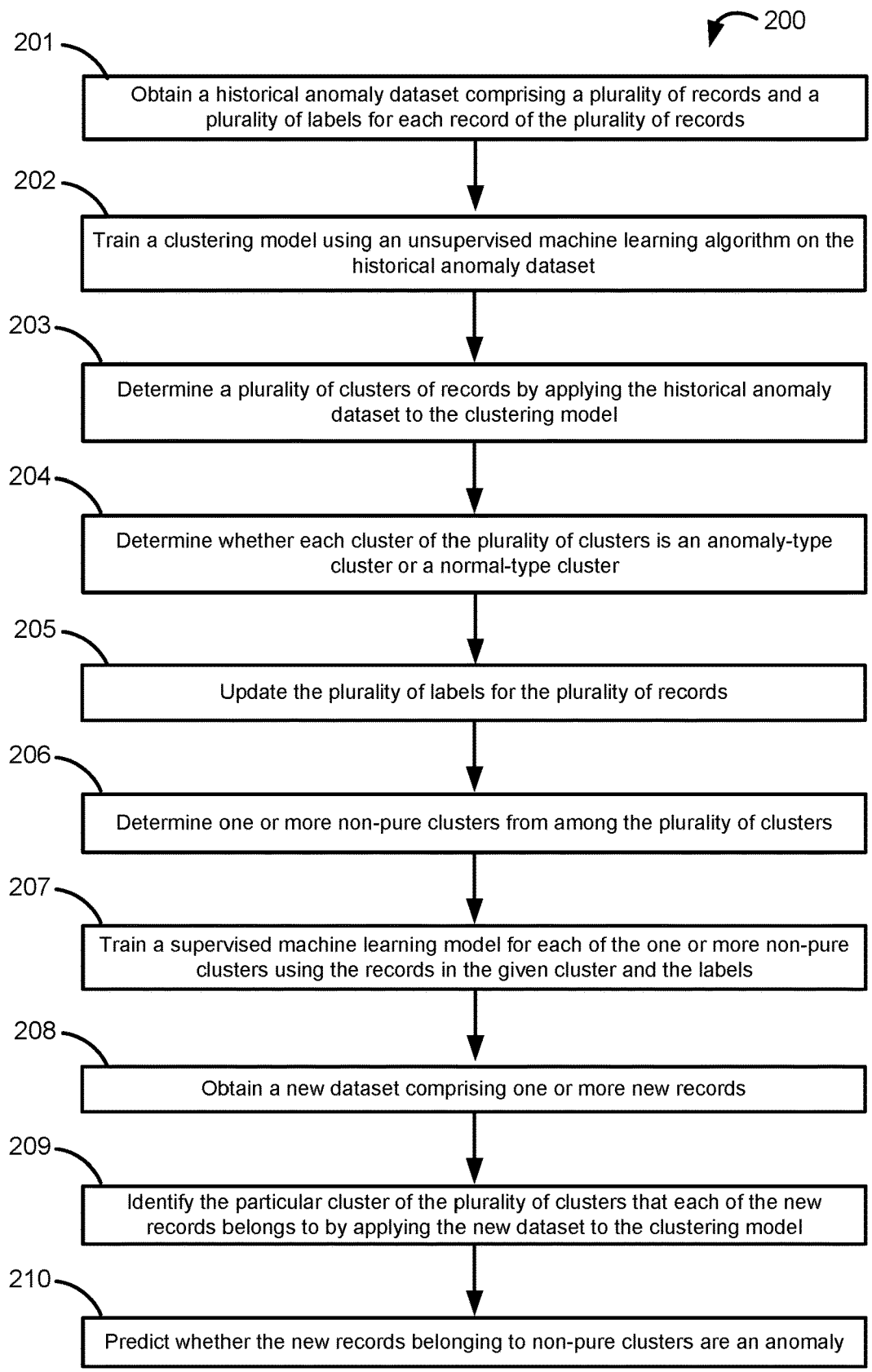
FIG. 2 shows a flowchart of a method for anomaly detection, according to an embodiment.

FIG. 2 shows a flowchart 200 of a computer-implemented method for anomaly detection, according to an embodiment. The method may further incorporate the anomaly detection techniques described herein.

At 201, obtain a historical anomaly dataset comprising a plurality of records and a plurality of labels for each record of the plurality of records, each label indicating whether a particular record is normal or an anomaly.

At 202, train a clustering model using an unsupervised machine learning algorithm on the historical anomaly dataset.

At 203, determine a plurality of clusters of records by applying the historical anomaly dataset to the clustering model.

At 204, determine whether each cluster of the plurality of clusters is an anomaly-type cluster or a normal-type cluster, the determination of the anomaly-type based on a number of anomaly records in the given cluster being greater than a number of normal records in the given cluster, the determination of the normal-type based on the number of normal records in the given cluster being greater than the number of anomaly records in the given cluster.

At 205, update the plurality of labels for the plurality of records based on the particular record's cluster classification being the anomaly-type or the normal-type.

At 206, determine one or more non-pure clusters from among the plurality of clusters based on a percentage of normal-labeled records in a normal-type cluster being less than a predetermined purity threshold or based on a percentage of anomaly-labeled records in an anomaly-type cluster being less than the purity threshold.

At 207, train a supervised machine learning model for each of the one or more non-pure clusters using the records in the given cluster and the labels for each of those records.

The unsupervised clustering model and the supervised machine learning models may be used to predict classifications for a new input dataset.

At 208, obtain the new dataset comprising one or more new records.

At 209, identify the particular cluster of the plurality of clusters that each of the new records belongs to by applying the new dataset to the clustering model.

At 210, predict whether the new records belonging to non-pure clusters are an anomaly by applying the new records to the supervised machine learning model for the corresponding non-pure cluster that they belong to.

Further details of the Anomaly Detection Framework are given below.

Figure 3:
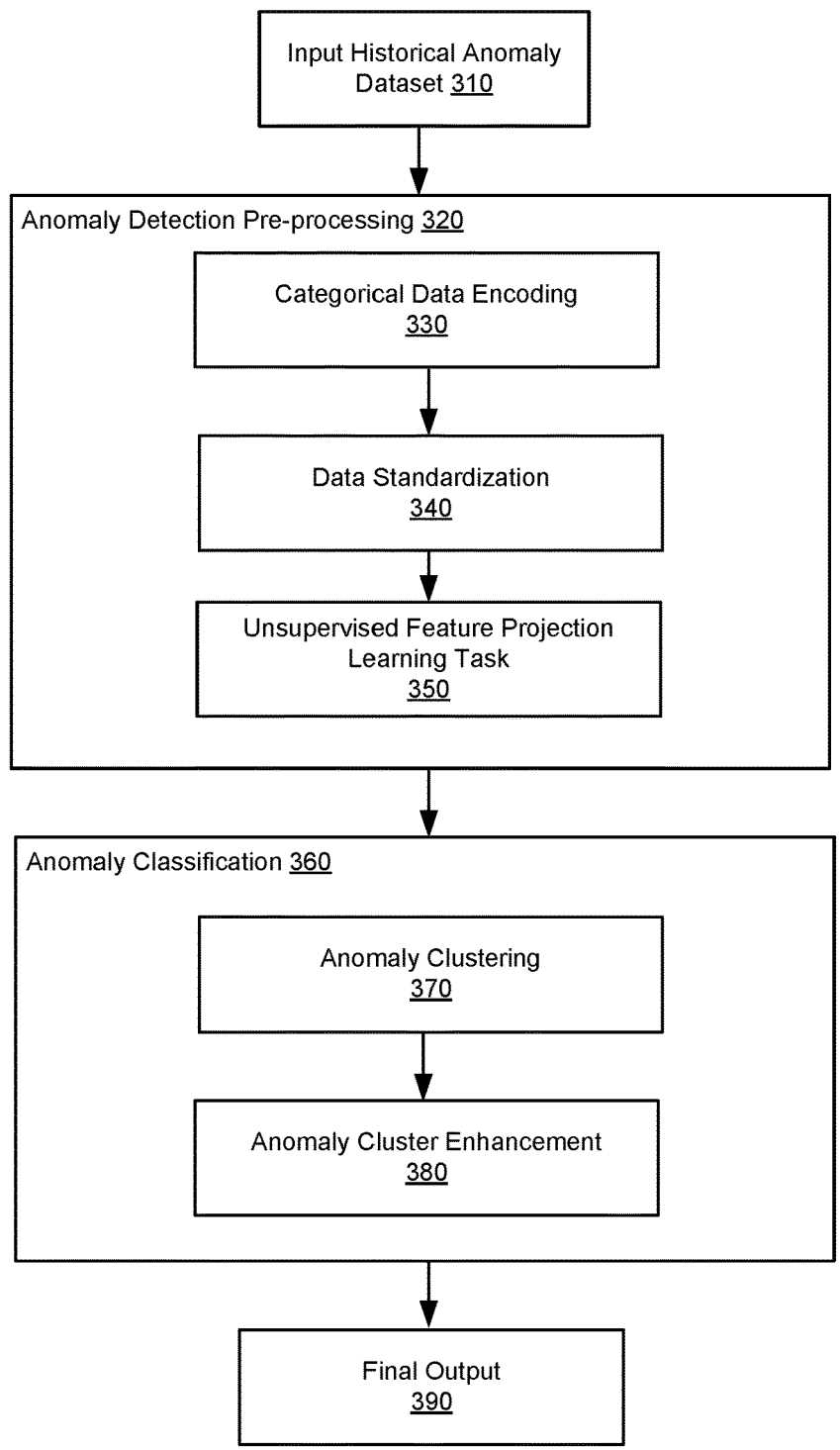
FIG. 3 shows a flowchart of an Anomaly Detection Framework including anomaly detection pre-processing and anomaly classification, according to an embodiment.

FIG. 3 shows a flowchart 300 of an Anomaly Detection Framework including anomaly detection pre-processing 320 and anomaly classification 360, according to an embodiment. The Anomaly Detection Framework may be implemented by a computer system (e.g., a cloud-based system or another system including one or more computer machines or computer servers in communication with one another).

The Anomaly Detection Framework and corresponding techniques may be applicable to any input historical anomaly dataset 310. Herein, a "historical anomaly dataset" is considered any dataset gathered from the result of monitoring a plurality of IT components that compose modern IT infrastructures (e.g., computer servers and software application performance, database performance, networking components and infrastructure performance, etc.). The dataset may contain a mixture of normal and anomalous records and consists of at least one input feature and an anomaly label feature, referenced herein as "target feature," indicating if the record is anomalous or normal. As used herein, an "anomaly" generally refers to data points that deviate from a dataset's normal behavior, which may indicate a problem or critical event, such as a technical glitch or a change in user behavior.

The architecture of the framework consists of two parts, Anomaly Detection Pre-Processing 320 and Anomaly Classification 360. An overview of these components of the Anomaly Detection Framework is now provided with respect to FIG. 3 with additional details of these components being described below with respect to FIG. 4-13.

The Anomaly Detection Pre-Processing 320 part of the Anomaly Detection Framework consists of three components, Categorical Data Encoding 330, Data Standardization 340, and Unsupervised Feature Projection Learning Task 350.

The Categorical Data Encoding 330 component may identify all categorical features contained within the input historical anomaly dataset 310 and apply a treatment, transforming the categories of each identified categorical feature feat into numeric representations, enabling their consumption by downstream modelling components of the framework. The encoded categorical features may then be combined with the continuous features of the input historical anomaly dataset 310, and the original untreated versions of the categorical features may be discarded. The updated dataset is then passed to the Data Standardization 340 component.

The Data Standardization 340 component may take as input the processed input historical anomaly dataset and apply an independent standardization treatment to each feature of the processed input historical anomaly dataset, transforming each feature of the dataset to have mean 0 and variance 1. The standardization of the input historical anomaly dataset may ensure that the features of the dataset are of comparable scale and range, which may ensure that no feature dominates in any downstream modelling tasks. Further details on data standardization is provided in below. As output, a standardized input historical anomaly dataset is produced and subsequently passed to the Unsupervised Feature Projection Learning Task 350 component.

The Unsupervised Feature Projection Learning Task 350 component may take as input the standardized input historical anomaly dataset and perform feature projection using an unsupervised feature projection learning task. The unsupervised feature project learning task may learn a model enabling the projection of the features of the standardized input historical anomaly dataset to a new dimensionally reduced dataset. It is worth noting unsupervised feature project learning task does not take the target feature into account. The output dimensionally reduced dataset may contain fewer features than that of the standardized input historical anomaly dataset while preserving most of the information contained within the standardized input historical anomaly dataset. The output dimensionally reduced dataset is then passed to Anomaly Classification 360 part.

The Anomaly Classification 360 part consists of two components, Anomaly Clustering 370 and Anomaly Cluster Enhancement 380.

The Anomaly Clustering 370 component may take as input the dimensionality reduced dataset and may learn a clustering model grouping the dimensionality reduced dataset into clusters where data items (e.g., rows) identified as having similar features are assigned to the same cluster. Then, for each identified cluster, an Anomaly Cluster Assignment Heuristic is applied classifying the cluster as either an anomaly cluster or as a normal cluster where each dimensionality reduced data item within the cluster is subsequently updated and classified as either anomaly or normal depending on the classification type of the cluster it is associated to. Once all clusters are processed, the classified dimensionality reduced dataset is then passed to the Anomaly Cluster Enhancement 380 component.

The Anomaly Cluster Enhancement 380 component may take the classified dimensionality reduced dataset and the original input historical anomaly dataset 310 as input. For each cluster, the associated data items within the classified dimensionality reduced dataset may be identified and an Enhancement Candidate Cluster Identification Heuristic may be applied, determining if the cluster is a candidate for accuracy enhancement. Once all candidate clusters for accuracy enhancement are identified, for each candidate cluster, the associated classified dimensionality reduced dataset items are identified and the learned clustering model applied, producing for each dataset item n predicted probabilities of assignment to n clusters, where n represents the number of clusters available for assignment. The n predicted probabilities values range from between 0 to 1 and sum to 1. Next, the associated historical anomaly dataset items from the original input historical anomaly dataset are identified and feature engineering may be performed. Subsequently, the n predicted probabilities, the associated classified dimensionality reduced dataset items, engineered features, and target feature are combined producing for each cluster, the candidate cluster anomaly classification enhancement dataset.

Applying the learned cluster model to produce probabilities of cluster assignment and utilizing these probabilities to combine with the existing related dimensionality reduced dataset items plus any additional derived features may produce a dataset per cluster that contains sufficient additional information to enable a supervised learning model to be trained to separate anomaly and normal records with increased accuracy.

Therefore, utilizing the candidate cluster anomaly classification enhancement dataset, the target feature is identified, and the remaining features are used as input to learn a classification model that may classify each candidate cluster anomaly classification enhancement data item as either an anomaly or normal.

Once all candidate clusters are processed, and predictions are produced, the enhanced classified dimensionality reduced dataset predictions are combined with anomaly classification produced by untreated non-candidate clusters and the final output 390 of anomaly classifications for the input historical anomaly dataset produced.

Features and advantages of the Anomaly Detection Framework and corresponding techniques including the ability for new input anomaly data items to be easily assigned to an anomaly classification cluster, where if assigned to a Candidate Cluster for Accuracy Enhancement have an additional anomaly classification treatment applied, and classified as either an anomaly or normal with an expected degree of accuracy. Thus, anomalies may be detected with accuracy near to the accuracy provided by deep learning techniques while using a combination of unsupervised and supervised learning that can be learned more quickly and using fewer computing resources.

The Anomaly Detection Framework is discussed in more detail below with respect to FIG. 4-13. The Anomaly Detection Pre-processing 320 part in FIG. 3 is described in detail below with respect to FIGS. 4-9.

Figure 4:
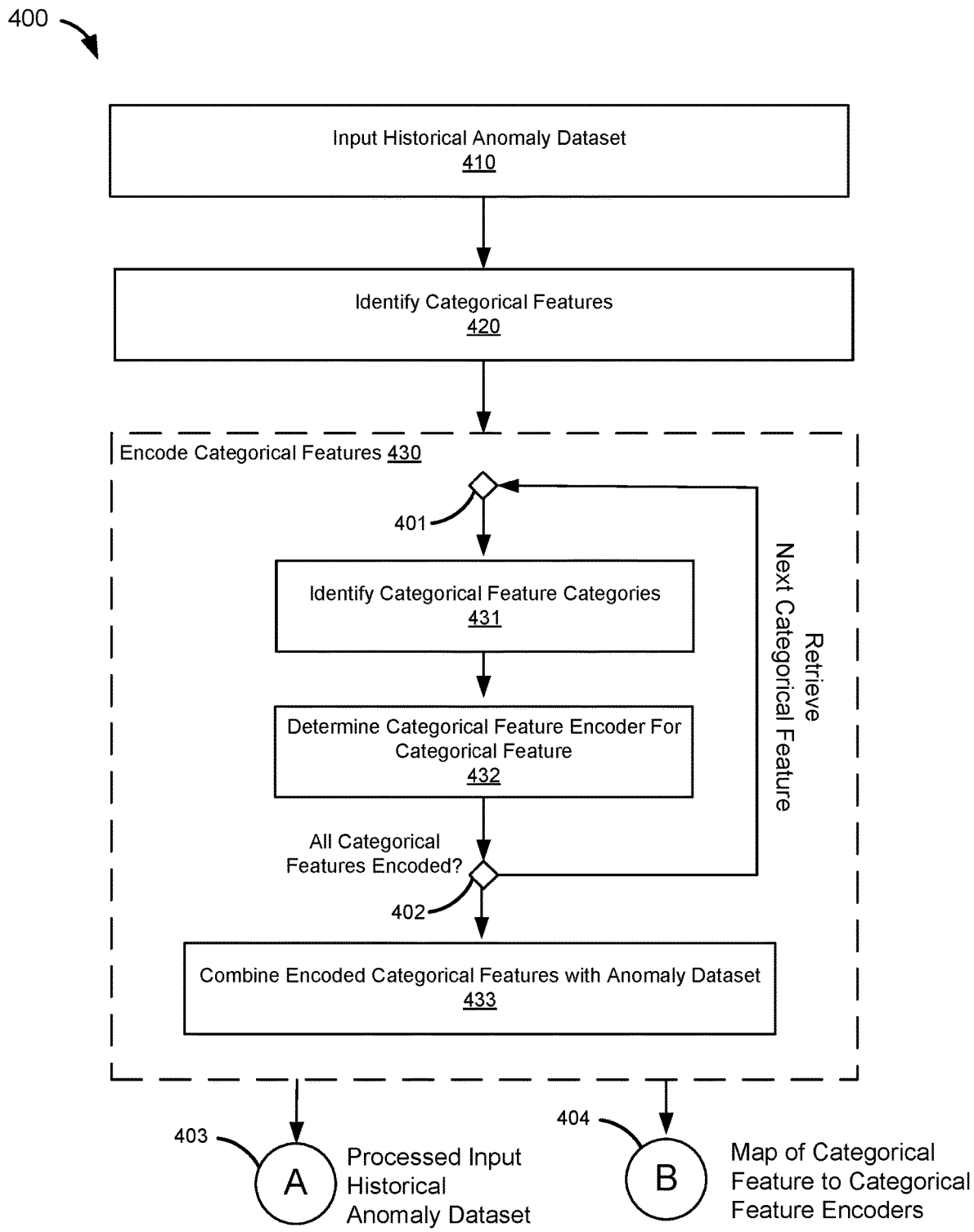
FIG. 4 shows a diagram of building categorical data encoders, according to an embodiment.
Figure 5:
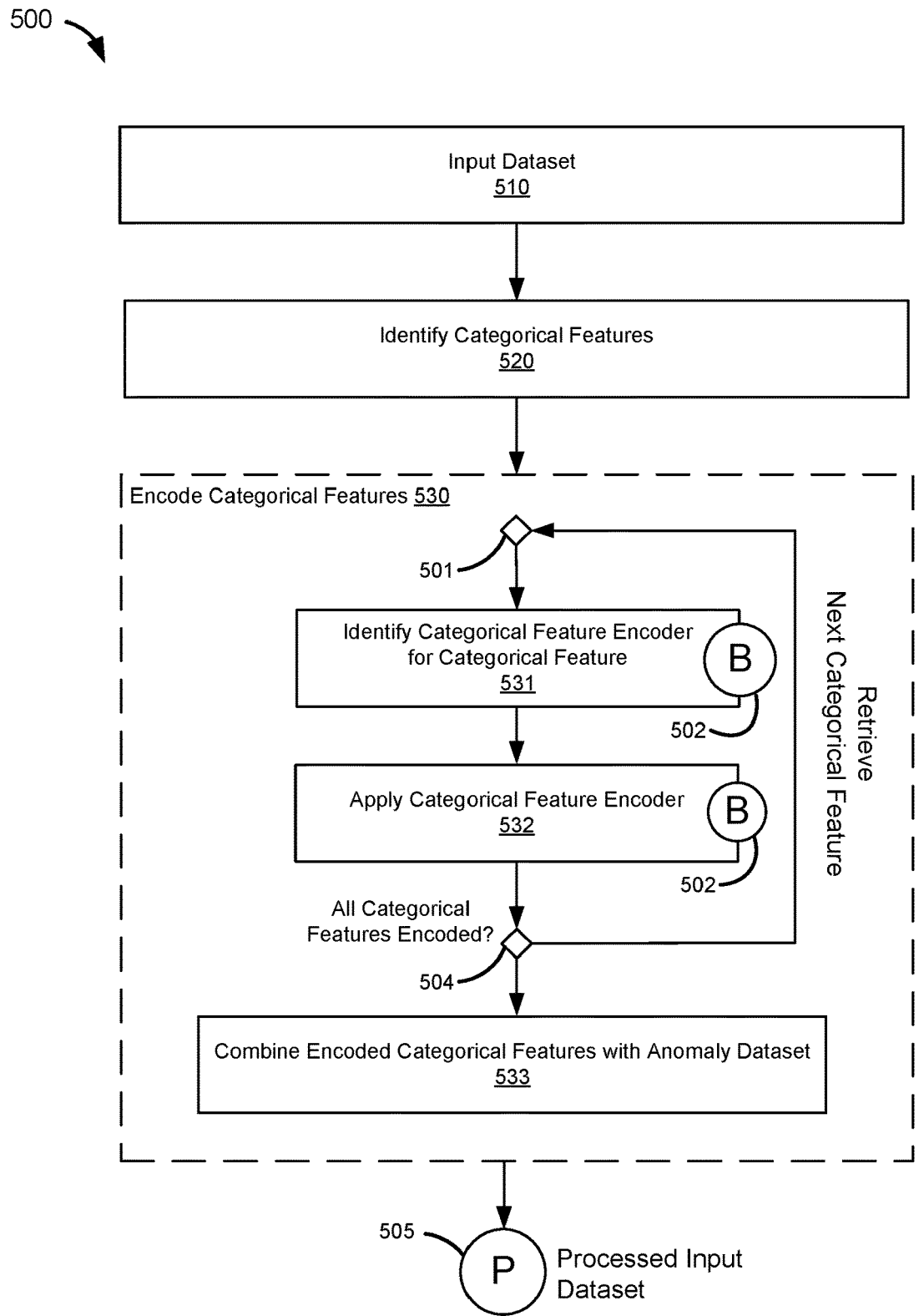
FIG. 5 shows a diagram of applying categorical data encoders, according to an embodiment.

FIG. 4 and FIG. 5 and their corresponding description below provide further details on the Categorical Data Encoding 330 component in FIG. 3. FIG. 4 shows building of the categorical data encoders and FIG. 5 shows application of the categorical data encoders.

Figure 6:
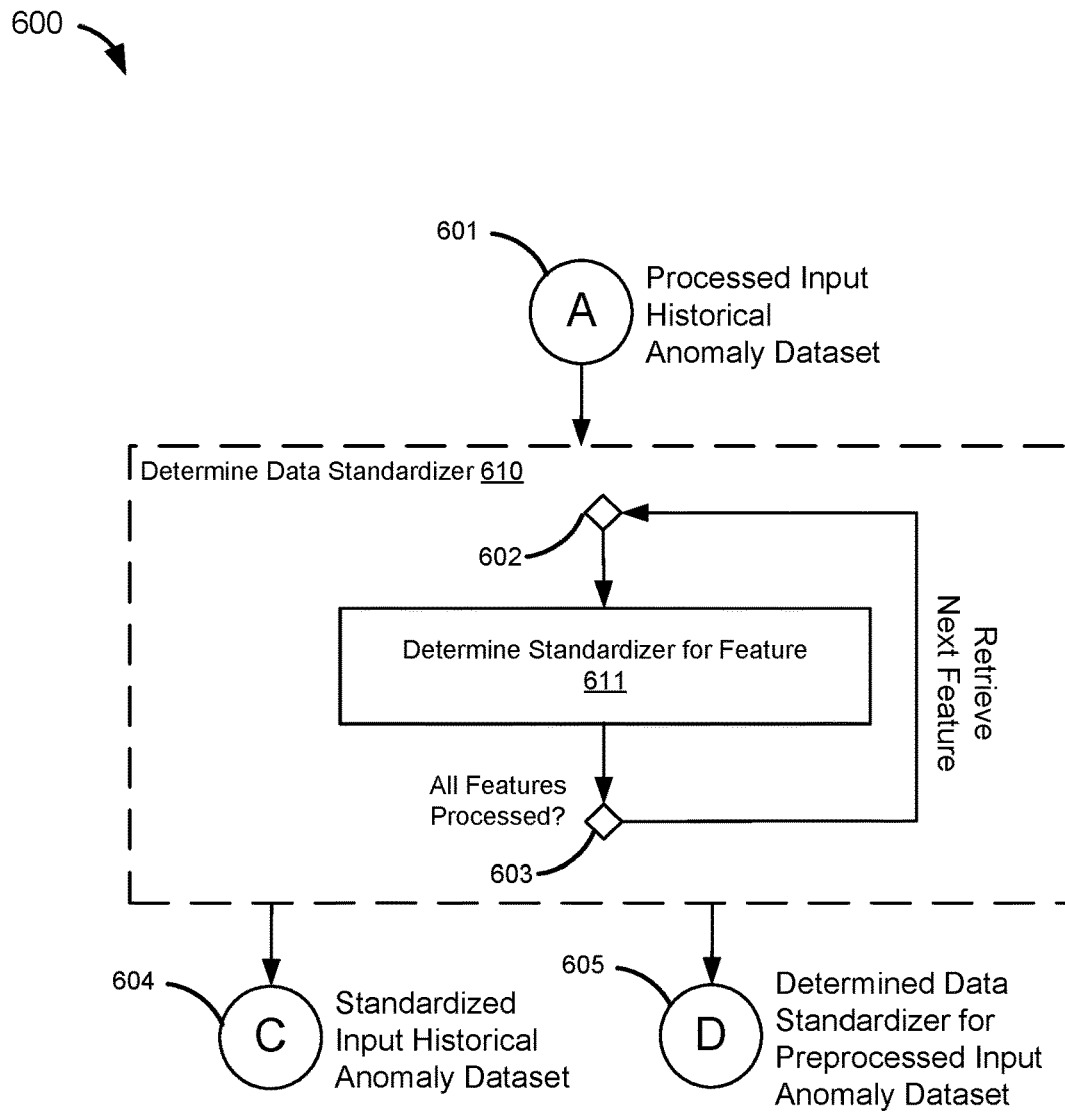
FIG. 6 shows a diagram of building data standardizers, according to an embodiment.
Figure 7:
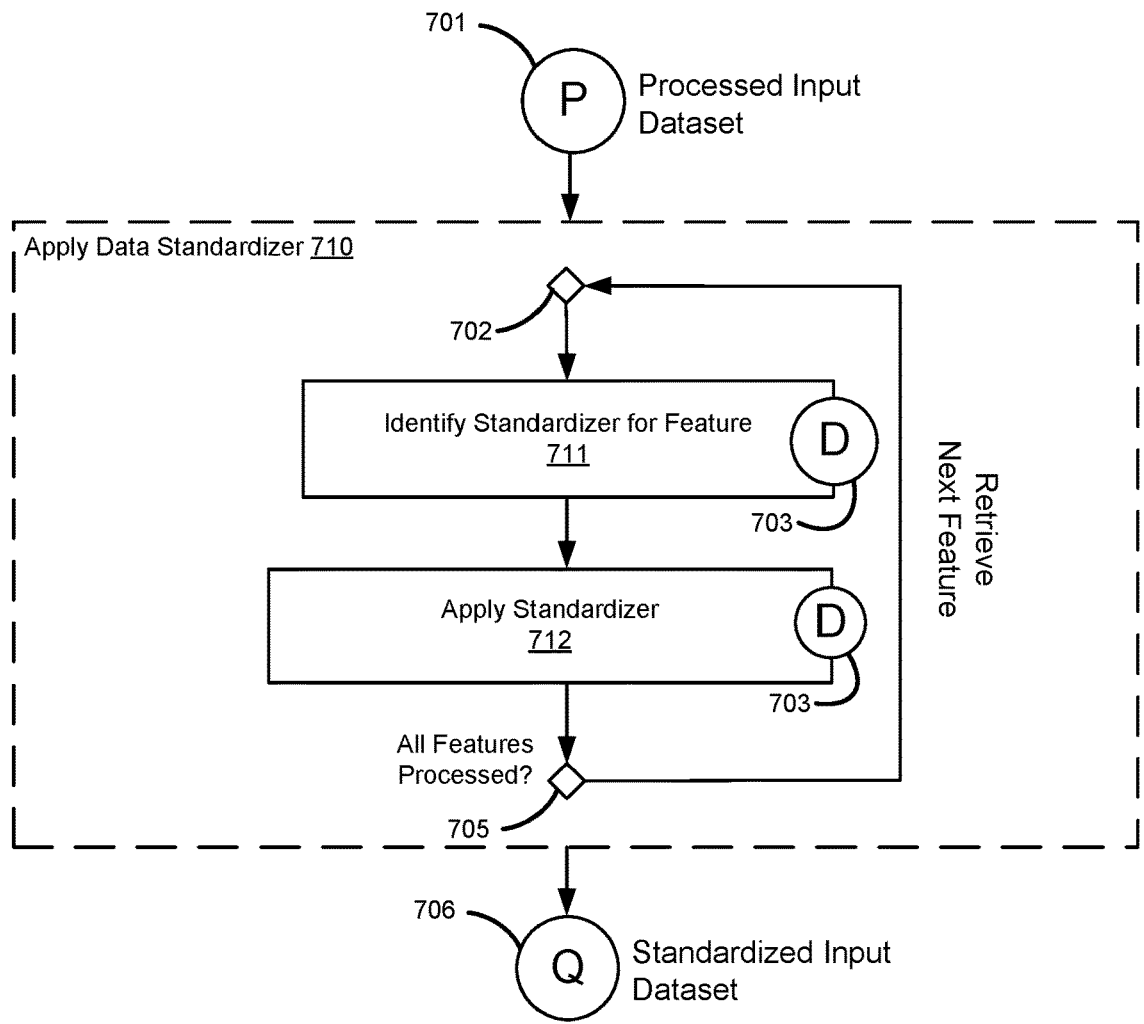
FIG. 7 shows a diagram of applying data standardizers, according to an embodiment.

FIG. 6 and FIG. 7 and their corresponding description below provide further details on the Data Standardization 340 component in FIG. 3. FIG. 6 shows building of data standardizers and FIG. 7 shows applying the data standardizers.

Figure 8:
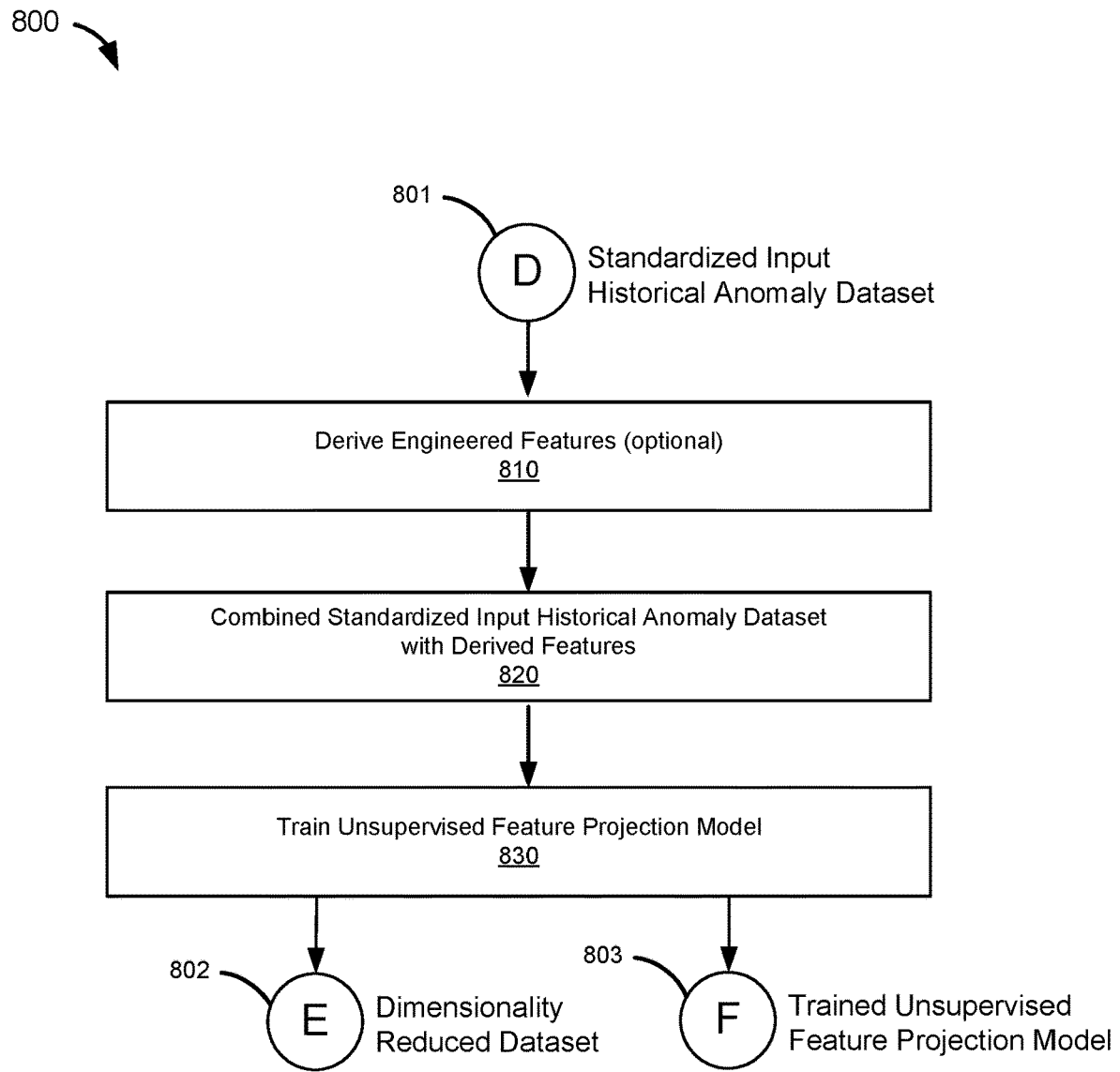
FIG. 8 shows a diagram of training an unsupervised feature projection model, according to an embodiment.
Figure 9:
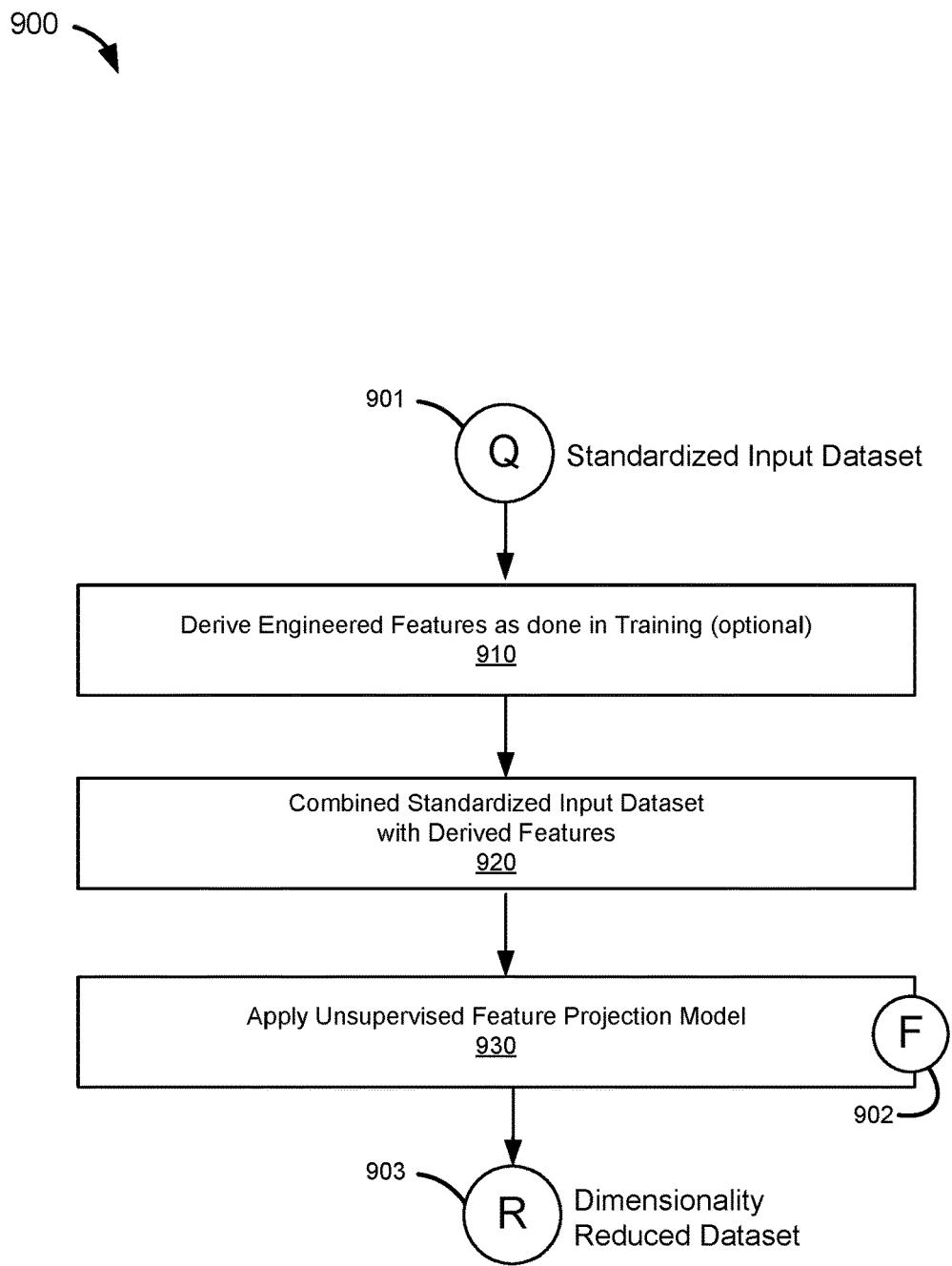
FIG. 9 shows a diagram of applying an unsupervised feature projection model, according to an embodiment.

FIG. 8 and FIG. 9 and their corresponding description below provide further details on the Unsupervised Feature Projection Learning Task 350 in FIG. 3. FIG. 8 shows training of an unsupervised feature projection model and FIG. 9 shows application of the unsupervised feature projection model.

Figure 10:
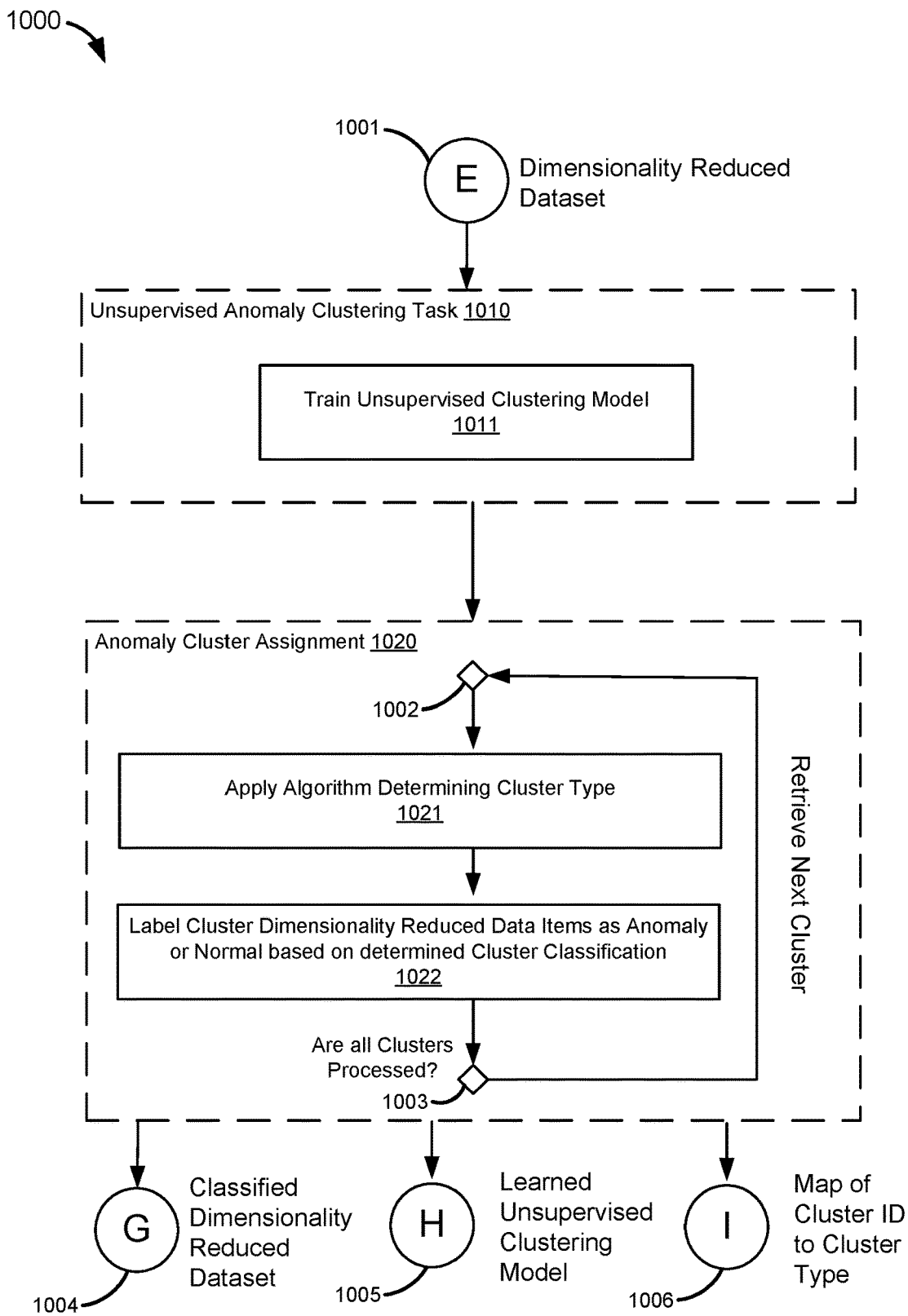
FIG. 10 shows a diagram of training an unsupervised anomaly clustering model, according to an embodiment.
Figure 11:
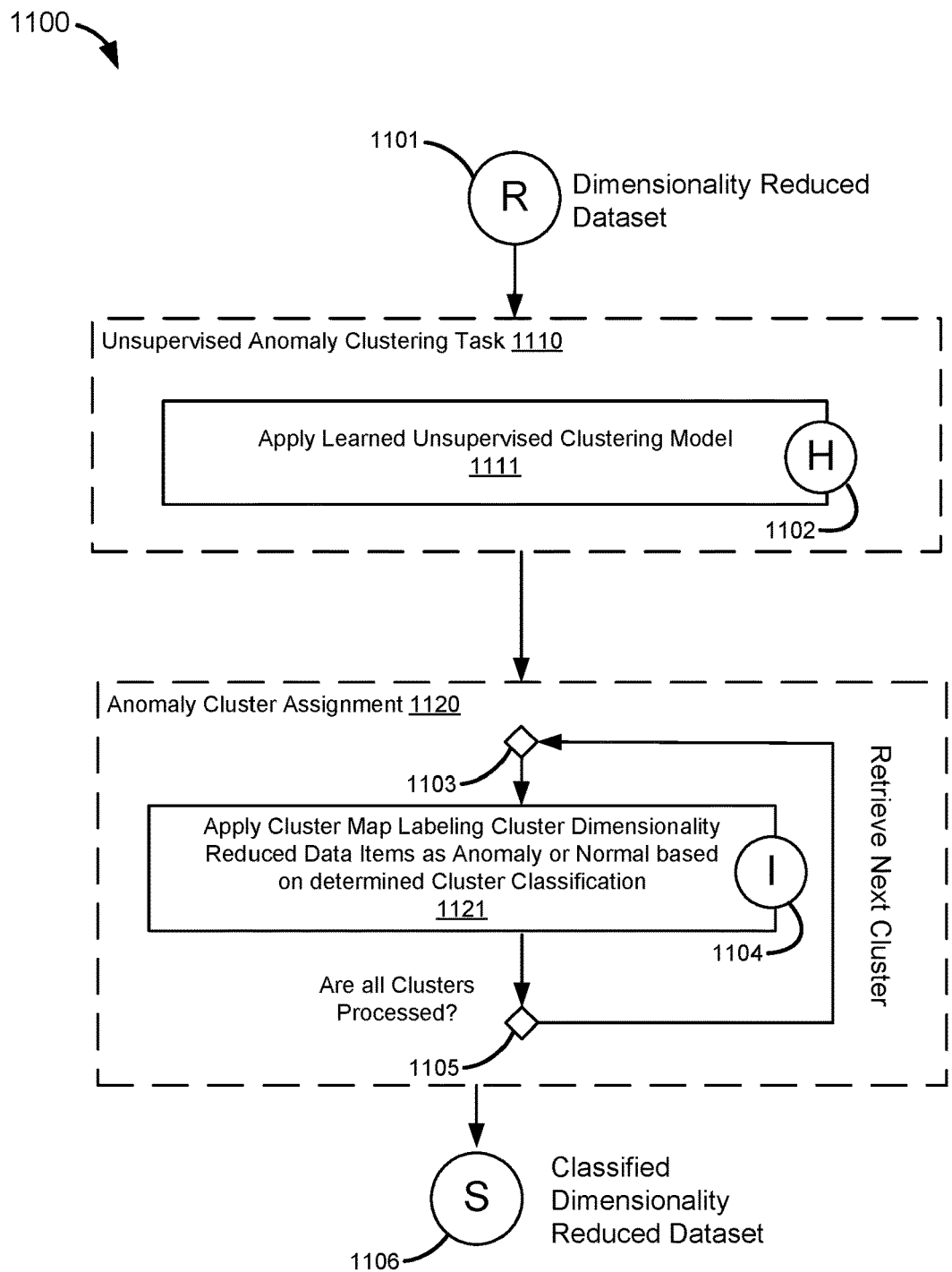
FIG. 11 shows a diagram of applying an unsupervised anomaly clustering model, according to an embodiment.
Figure 12:
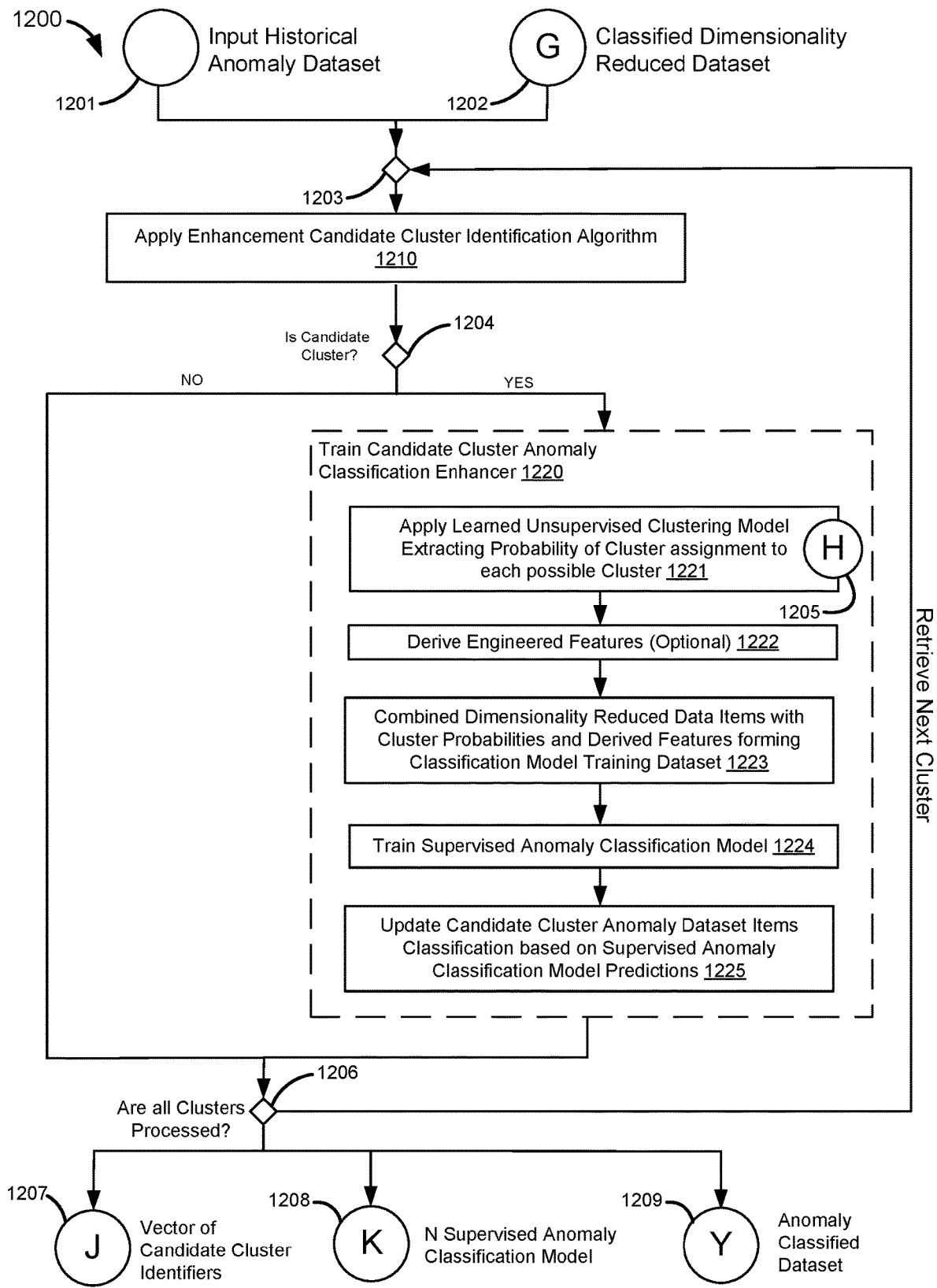
FIG. 12 shows a diagram of training a supervised anomaly cluster enhancement model, according to an embodiment.
Figure 13:
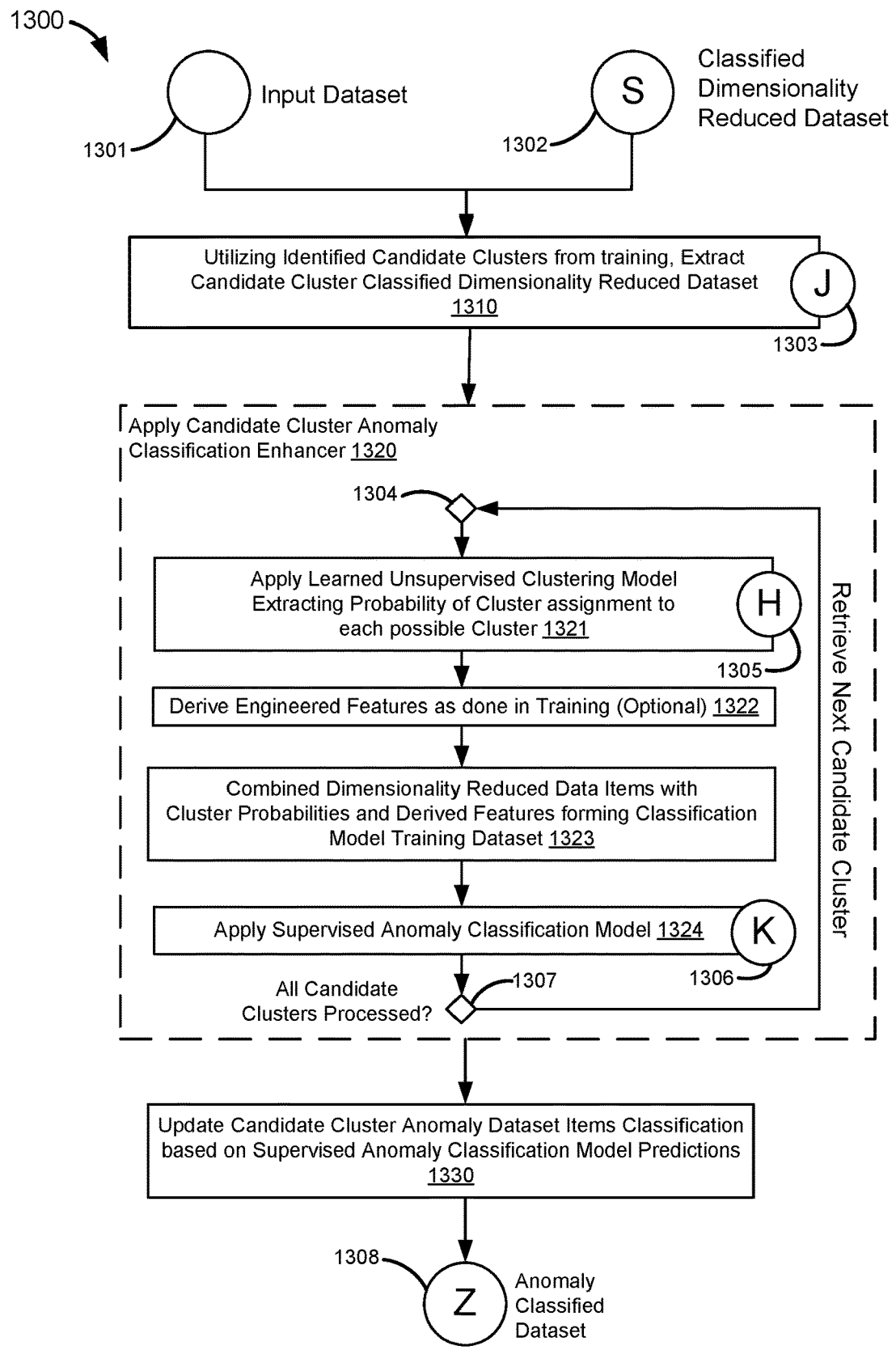
FIG. 13 shows a diagram of applying a supervised anomaly cluster enhancement model, according to an embodiment.

The Anomaly Classification 360 part in FIG. 3 is described in detail below with respect to FIGS. 10-13. FIGS. 10 and 11 and their corresponding description below provide further details on the Anomaly Clustering 370 component in FIG. 3. FIGS. 12 and 13 and their corresponding description below provide further details on the Anomaly Cluster Enhancement 380 component in FIG. 3.

Anomaly Detection Pre-Processing

As mentioned above, the Anomaly Detection Pre-processing 320 part consists of three components: Categorical Data Encoding 330, Data Standardization 340, and Unsupervised Feature Projection Learning Task 350. An overview of anomaly detection pre-processing is now provided.

The Categorical Data Encoding 330 component may identify all categorical and continuous features contained within the input historical anomaly dataset. Herein, a "Continuous Feature" denotes numeric data having an infinite number of possible values within a selected range and "Categorical Feature" denotes data containing a finite number of possible categories where the data may or may not have a logical order. An example of a continuous feature would be temperature. An example of categorical data includes days of the week.

For each categorical feature identified by the Categorical Data Encoding 330 component, a treatment may be applied transforming the categories of each identified categorical feature into numeric representations, enabling their consumption by downstream components of the framework. The numerically encoded categorical features may then be combined with the continuous features of the input historical anomaly dataset, and the original untreated versions of the categorical features may be discarded, producing the processed input historical anomaly dataset. The output processed input historical anomaly dataset is then passed to the Data Standardization 340 component.

The Data Standardization 340 component takes as input the processed input historical anomaly dataset and applies an independent standardization treatment to each feature of the processed input historical anomaly dataset, transforming each feature of the dataset to have mean 0 and variance 1. The output standardized input anomaly dataset is then passed to the Unsupervised Feature Projection Learning Task 350 component.

The Unsupervised Feature Projection Learning Task 350 component takes as input the standardized input anomaly dataset and performs feature projection through learning an unsupervised feature projection model. The learned model enables the projection of the features of the standardized input anomaly dataset to a new dimensionally reduced dataset. The output dimensionally reduced dataset may contain fewer features than that of the standardized input anomaly dataset while preserving most of the information within the standardized input feature dataset. The output dimensionally reduced dataset is then passed to Anomaly Classification 360 part, which is described below with respect to FIG. 10-13. The components of the Anomaly Detection Pre-processing 320 part are discussed in more detail below with respect to FIG. 4-9.

Categorical Data Encoding

FIG. 4 and FIG. 5 and their corresponding description below provide further details on the Categorical Data Encoding 330 component in FIG. 3. FIG. 4 shows building of the categorical data encoders and FIG. 5 shows application of the categorical data encoders.

FIG. 4 shows a diagram 400 of building categorical data encoders, according to an embodiment. The process in diagram 400 may be performed by the Categorical Data Encoding 330 component described herein.

As mentioned above, the Anomaly Detection Framework may obtain an Input Historical Anomaly dataset 410 and Identify Categorical Features 420. Then the Anomaly Detection Framework may utilize an Encode Categorical Features 430 component such that for each categorical feature a categorical data encoder may be built by utilizing a categorical feature encoding algorithm to fulfil the categorical data encoding task. For each categorical feature, the Anomaly Detection Framework may Identify Categorical Feature Categories 431 and then Determine Categorical Feature Encoder For Categorical Feature 432.

At decision 402, it is checked whether all categorical features are encoded. If not, the process for building categorical data encoders retrieves the next categorical feature and continues to 401 to identify categories (at 431) and determine an encoder (at 432) for the next categorical feature.

If all categorical features are encoded, the encoded categorical features are then combined with the continuous features of the input historical anomaly dataset at 433 and the original untreated versions of the categorical features may be discarded. The output processed input historical anomaly dataset 403 (labeled "A") is then passed to the Data Standardization 340 component.

A map of categorical feature to categorical feature encoders 404 (labeled "B") is also output. This map 404 is used to identify categorical feature encoders for categorical features when applying the categorical feature encoders as described below with respect to FIG. 5.

An example of categorical feature encoding is now provided. Categorical feature encoding refers to the process of transforming categorial data into numerical representations, enabling the transformed categorical values to be utilized as input to machine learning modelling, or other modelling, processes. Through encoding and utilizing the categorical features in the modelling process, an improvement in performance may be achieved if the encoded categorical features contain information relevant to the modelling task at hand.

Several forms of categorical encoding processes exist, with One Hot encoding representing one. In One-Hot Encoding, each unique category of a categorical feature is transformed into a binary feature, with labels 1 or 0, where a 1 represents the presence of the category, and 0 the absence. The number of new binary features produced depends on the number of unique categories of the categorical feature getting encoded. In some versions of one-hot encoding algorithms, all categories of the categorical feature may be encoded and transformed into a binary feature, where in other versions n−1 categories will be transformed into binary features. This is a design choice, as the algorithm may be capable of inferring the presence of the non-encoded category through a row presenting all categories for an encoded categorical feature as 0.

FIG. 5 shows a diagram 500 of applying categorical data encoders, according to an embodiment. That is, applying the categorical data encoders built in FIG. 4 to a new Input Dataset 510. The process in diagram 500 may be performed by the Categorical Data Encoding 330 component described herein.

When a new Input Dataset 510 is obtained, the Anomaly Detection Framework may identify Categorical Features as done in in the encoder building phase, which was described above with respect to FIG. 4. In some embodiments, any categorical feature in the new input record of the input dataset 510 which was not present during the building phase may be discarded.

Then, the Anomaly Detection Framework encodes categorical features 530 for the input dataset 510. To do this, for each identified categorical feature 520, the categorical feature encoder learned in the training phase is retrieved at 531 using the map of categorical feature to categorical feature encoder 502 (404 in FIG. 4; labeled "B" in FIG. 4 and FIG. 5). Then, the categorical feature encoder 502 is applied at 532 to encode the categorical features into numeric representations.

At 504 it is determined whether all categorical features are encoded. If not, the Encode Categorical Features 530 process retrieves the next categorical feature and continues to 501, and then identifies the feature encoder (at 531) and applies the encoder (at 532) for the next categorical feature.

At 504, once all categorical features are processed, the Encoder Categorical Features 530 process continues to 533. At 533 the numerically encoded categorical features are combined with the input dataset, the original untreated categorical features may be discarded, and the processed input dataset 505 (labeled "P") may be passed to the Data Standardization 340 component.

Data Standardization

FIG. 6 and FIG. 7 and their corresponding description below provide further details on the Data Standardization 340 component in FIG. 3. FIG. 6 shows building of data standardizers and FIG. 7 shows applying the data standardizers.

FIG. 6 shows a diagram 600 of building data standardizers, according to an embodiment. The process in diagram 600 may be performed by the Data Standardization 340 component described herein.

The Anomaly Detection Framework includes a Determine Data Standardizer 610 component to build data standardizers for each feature. The processed input historical anomaly dataset 601 (403 in FIG. 3; labeled "A" in FIG. 3 and FIG. 6) is received as input to the Determine Data Standardizer 610 component. Then, for each feature within the processed input historical anomaly dataset 601, a standard standardizer is determined at 611 utilizing the feature values, transforming each feature of the dataset to have mean 0 and variance 1.

At 603 it is determined whether all features have been processed to determine the standardizer for the feature at 611. If not, the process retrieves the next feature and continues to 602 and then determines a standardizer for the next feature at 611. If all features have been processed the Determine Data Standardizer 610 component is finished processing the features of the processed input historical anomaly dataset 601.

The output of the Determine Data Standardizer 610 component is a standardized input historical anomaly dataset 604 (labeled "C") and a list of determined data standardizers 605 (labeled "D") for the preprocessed input anomaly dataset 601. Each of these data standardizers is related to a single feature of the input historical anomaly dataset. The standardized input historical anomaly dataset 604 is then passed to the Unsupervised Feature Projection Learning Task 350 component.

FIG. 7 shows a diagram 700 of applying data standardizers, according to an embodiment. That is, applying the data standardizers determined in FIG. 6 to a processed input dataset 701 (505 in FIG. 5, labeled "P"). The Anomaly Detection Framework includes an Apply Data Standardizer 710 component to apply the data standardizers to the Processed Input Dataset 701. The process in diagram 700 may be performed by the Data Standardization 340 component described herein.

The Processed Input Dataset 701 is passed to the Data Standardizer 710 component as input for application. The Data Standardizer 710 component identifies for each feature the related data standardizer at 711 using the determined data standardizer 703 (605 in FIG. 6, labeled "D"). The Data Standardizer 710 then proceeds to apply the learned standardizer 703 at 712, transforming the values of the feature to values which fit the distribution of the corresponding features values from the training phase.

At 705 the Data Standardizer component 710 determines whether all features have been processed. If not, the process retrieves the next feature and continues to 702 to identify a standardizer (at 711) and apply the standardizer (at 712) for the next feature.

Once all features are processed the output standardized input dataset 706 (labeled "Q") is passed to the Unsupervised Feature Projection Learning Task 350 component.

Unsupervised Feature Projection Learning Task

Signals representing the pattern of interest may be mixed up within the features of a dataset. For example, sounds recorded via several microphones may represent sound from different sources in the environment. A goal is to discover the underlying origin signals that cannot be directly or clearly seen in the observed data and provide the information enabling the important patterns to be identified. That is the purpose of the Unsupervised Feature Projection Learning Task 350 component.

FIG. 8 and FIG. 9 and their corresponding description below provide further details on the Unsupervised Feature Projection Learning Task 350 in FIG. 3. FIG. 8 shows training of an unsupervised feature projection model and FIG. 9 shows applying the trained unsupervised feature projection model.

FIG. 8 shows a diagram 800 of training an unsupervised feature projection model 803, according to an embodiment. The Unsupervised Feature Projection Learning Task 350 component receives a Standardized Input Historical Anomaly Dataset 801 (605 in FIG. 6, labeled "D") as input. The process in diagram 800 may be performed by the Unsupervised Feature Projection Learning Task 350 component described herein.

The Unsupervised Feature Projection Learning Task 350 component trains an Unsupervised Feature Projection Model 803 (labeled "F") to reduce the dimensionality of the dataset 801 to a predefined number of features, resulting in the Dimensionality Reduced Dataset 802 (labeled "E"). Through the learning of a feature projection model, the informational patterns indicating anomaly and normal behavior may be maintained while also becoming easier or more obvious to identify, and thus separate in the downstream clustering task.

At 810, additional features can optionally be derived and combined at 820 with the input standardized historical anomaly dataset forming the unsupervised feature projection model training dataset that is subsequently used as input for training, at 830, the Unsupervised Feature Projection Model 803. In some embodiments, the Unsupervised Feature Project Learning 350 task may not take the target feature into account during these processes.

As an example, FastICA (Fast Independent Component Analysis) may be utilized for the feature projection model. As an example, it may be configured to output 30 components (features). In other embodiments it may output a different number of components (e.g., 10, 20, 40, 50). FastICA is an algorithm within the Independent Component Analysis group of Feature Projection Algorithms. Independent Component Analysis enables analysis of multi-feature datasets to discover the underlying components and origin signals contained within the dataset. In other embodiments, other unsupervised feature projection models can be utilized.

As output of the Unsupervised Feature Project Learning 350 task, a dimensionality reduced dataset 802 is produced consisting of a reduced number of features relative to the input unsupervised feature projection model training dataset, while also maintaining critical information to enable the identification and separation of anomalous behavior in the downstream clustering task. The output dimensionality reduced dataset 802 is then passed to the Anomaly Classification 360 part of the Anomaly Detection Framework.

FIG. 9 shows a diagram 900 of applying an unsupervised feature projection model, according to an embodiment. That is, applying a standardized input dataset 901 (706 in FIG. 7, labeled "Q"), optionally combined with engineered features, to the unsupervised feature projection model 902 (803 in FIG. 8; labeled "F") trained at 830. The process in diagram 900 may be performed by the Unsupervised Feature Projection Learning Task 350 component described herein.

The Standardized Input Dataset 901 is passed as input to the Unsupervised Feature Projection Learning Task 350 component for application. Using the Standardized Input Dataset 901, the same additional engineered features as used in the training stage (810 in FIG. 8) may be derived at 910 and combined, at 920, with the Standardized Input Dataset 901, forming the unsupervised feature projection model apply dataset. Then the learned Unsupervised Feature Projection Model 902 ("F") is applied at 930, projecting the unsupervised feature projection model apply dataset and producing as output a dimensionality reduced dataset 903 (labeled "R"). The output dimensionality reduced dataset 903 is then passed to the Anomaly Classification 360 part of the Anomaly Detection Framework.

Anomaly Classification

As mentioned above, the Anomaly Classification 360 part of the Anomaly Detection Framework consists of two components, the Anomaly Clustering 370 component and Anomaly Cluster Enhancement 380 component. An overview of anomaly classification is now provided.

The Anomaly Clustering 370 component takes as input the dimensionality reduced dataset and learns (unsupervised) a clustering model grouping the dimensionality reduced dataset into clusters where data items (rows) identified as having similar features are assigned to the same cluster. Then, for each identified cluster, an Anomaly Cluster Assignment Algorithm is applied, classifying the cluster as either an anomaly or normal cluster, where each record within the cluster is subsequently updated and classified as either anomaly or normal depending on the classification type of the cluster it is associated to. Once all clusters are processed, the classified dimensionality reduced dataset is then passed to the Anomaly Cluster Enhancement component.

Further details on the training of the unsupervised anomaly clustering model is described below with respect to FIG. 10 and application of the unsupervised anomaly clustering model is described below with respect to FIG. 11.

The Anomaly Cluster Enhancement 380 component takes the classified dimensionality reduced dataset and the original input historical anomaly dataset as input. For each cluster, the associated data items within the classified dimensionality reduced dataset are identified and the Enhancement Candidate Identification Algorithm applied determining if the cluster is a candidate cluster for accuracy enhancement. Once all candidate clusters for accuracy enhancement are identified, for each candidate cluster, the associated classified dimensionality reduced dataset items, the learned clustering model, the associated historical anomaly dataset items, and target feature are processed producing for each cluster, a candidate cluster anomaly classification enhancement dataset.

Then, utilizing the candidate cluster anomaly classification enhancement dataset, the target feature is identified, and the remaining features are used as input to learn a supervised classification model classifying each candidate cluster anomaly classification enhancement data item as either an anomaly or normal. Once all candidate clusters are processed, and predictions are produced, the candidate cluster enhanced anomaly classifications are combined with anomaly classifications produced by untreated non-candidate clusters and the final output of anomaly classifications for the input historical anomaly dataset produced.

Further details on training the supervised anomaly cluster enhancement model are described below with respect to FIG. 12 and further details on application of the supervised anomaly cluster enhancement model are described below with respect to FIG. 13.

With the above framework, new input anomaly data items can be assigned to an anomaly classification cluster, where if assigned to a Candidate Cluster for Accuracy Enhancement have an additional anomaly classification treatment applied and are classified as either an anomaly or normal with an expected degree of accuracy.

Anomaly Clustering

In the Anomaly Clustering 370 part, a clustering algorithm is learned to group dimensionality reduced data items into clusters where data items (i.e., rows) identified as eliciting similar behavioral patterns are assigned to the same cluster. Through the dimensionality reduced dataset output from the feature projection component, the underlying latent anomaly and normal signals may have become more evident, which may enable the clustering algorithm to separate the dimensionality reduced data items into anomaly and normal clusters (i.e., groups).

FIG. 10 shows a diagram 1000 of training an unsupervised anomaly clustering model, according to an embodiment. The process in diagram 1000 may be implemented by the Anomaly Clustering 370 component. The Anomaly Clustering 370 component may perform an Unsupervised Anomaly Clustering Task 1010 component and an Anomaly Cluster Assignment 1020 component.

The Anomaly Clustering 370 component takes as input the dimensionality reduced dataset 1001 (802 in FIG. 8; labeled "E") and passes the data 1001 to the Unsupervised Anomaly Clustering Task 1010 subcomponent. The Unsupervised Anomaly Clustering Task 1010 subcomponent proceeds train an unsupervised clustering model at 1011, to learn a clustering model that groups the input dimensionality reduced dataset 1001 into clusters where data items (i.e., rows) identified to elicit similar behavior are assigned to the same cluster. Subsequently, a new feature is materialized for each dimensionality reduced data item indicating its associated cluster.

The clustered dimensionality reduced dataset is then passed to the Anomaly Cluster Assignment 1020 subcomponent. That subcomponent 1020 takes the clustered dimensionality reduced dataset as input and for each cluster, applies at 1021 the Anomaly Cluster Assignment Algorithm determining the cluster type as either anomaly or normal. Subsequently each dimensionality reduced data item within the cluster has its label updated, at 1022, and is classified as anomaly or normal based on the determined cluster type.

At 1003, the Anomaly Cluster Assignment 1020 subcomponent determines whether all clusters have been processed. If not, the Anomaly Cluster Assignment 1020 subcomponent retrieves the next cluster and continues to 1002 to then determine the cluster type (at 1021) and update record labels (at 1022) for the next cluster.

Once all clusters are processed and dimensionality reduced data items classified, the classified dimensionality reduced dataset 1004 (labeled "G"), the learned unsupervised clustering model 1005 (labeled "H"), and a map of cluster identifier (ID) to cluster type 1006 (labeled "I") are produced as output and passed to the Anomaly Cluster Enhancement 380 component.

An example of the Anomaly Cluster Assignment Algorithm follows:

$$cluster_{classification} = \begin{cases} 'anomaly' & \text{if } num_{anomaly} \geq \text{num\_normal} \\ 'normal' & \text{otherwise} \end{cases}$$

$$num_{anomaly} = \sum_{i=0}^{num\ records\ in\ cluster} \begin{cases} 1 & \text{if target feature} = 'anomaly' \\ 0 & \text{otherwise} \end{cases}$$

$$num_{nomal} = \sum_{i=0}^{num\ records\ in\ cluster} \begin{cases} 1 & \text{if target feature} = 'normal' \\ 0 & \text{otherwise} \end{cases}$$

As an example unsupervised learning algorithm, the Gaussian Mixture Model may used to cluster the dimensionality reduced dataset. The algorithm is a probabilistic model used for clustering that is achieved through representing the data within normally distributed subpopulations. The anomaly and normal signals within the dimensionality reduced dataset may be represented through multiple gaussian distributions (components). Then when the learned Gaussian Mixture Model is given a data point, it can estimate the probability that the data point belongs to one of the components. Although the Gaussian Mixture Model algorithm is given as an example for clustering the dimensionality reduced dataset, any clustering algorithm that capable of outputting a probability of assignment to each cluster may be used.

FIG. 11 shows a diagram 1100 of applying an unsupervised anomaly clustering model, according to an embodiment. The process in diagram 1100 may be implemented by the Anomaly Clustering 370 component. Applying an unsupervised anomaly clustering model uses an Unsupervised Anomaly Clustering Task 1110 component and an Anomaly Cluster Assignment 1120 component.

The dimensionality reduced dataset 1101 (903 in FIG. 9, labeled "R") is passed as input to the Anomaly Clustering 370 component for application, which proceeds to pass the dataset 1101 to the Unsupervised Anomaly Clustering Task 1110 subcomponent. The Unsupervised Anomaly Clustering Task 1110 subcomponent proceeds to apply, at 1111, the learned unsupervised clustering model 1102 (1005 in FIG. 10; labeled "H"), grouping the dimensionality reduced dataset into clusters.

The clustered dimensionality reduced dataset is then passed to the Anomaly Cluster Assignment 1120 subcomponent. The Anomaly Cluster Assignment 1120 subcomponent takes, at 1121, the clustered dimensionality reduced dataset as input and for each cluster, utilizes the output cluster identifier to cluster type map 1104 (1006 in FIG. 10; labeled "I") to identify the clusters and cluster classification, and proceeds to label each dimensionality reduced data item as anomaly or normal based on the identified cluster classification.

At 1105, it is determined whether all clusters have been processed by the Anomaly Cluster Assignment 1120 component. If not, the Anomaly Cluster Assignment 1120 component retrieves the next cluster and continues to 1103 to label each data item and so on (at 1121) for the next cluster.

Once all clusters are processed and all dimensionality reduced data items classified, the classified dimensionality reduced dataset 1106 (labeled "S") is passed to the Anomaly Cluster Enhancement 380 component.

Anomaly Cluster Enhancement

FIG. 12 shows a diagram 1200 of training a supervised anomaly cluster enhancement model, according to an embodiment. The process shown in the diagram 1200 may be performed by the Anomaly Cluster Enhancement 380 component described herein.

The Anomaly Cluster Enhancement 380 component takes the original input historical anomaly dataset (input at 310 in FIG. 3) and the classified dimensionality reduced dataset 1202 (1004 in FIG. 10; labeled "G") as input. For each cluster, the associated classified dimensionality reduced data items within the classified dimensionality reduced dataset are identified and an Enhancement Candidate Cluster Identification Algorithm applied, at 1210, determining if the cluster is a candidate cluster for accuracy enhancement.

As an example, the Enhancement Candidate Cluster Identification Algorithm applied at 1210 is as follows. For each cluster a cluster purity factor is first determined. Then for each cluster, the related cluster purity factor is inspected and if it is determined to be less than a predefined purity threshold, the cluster and related Classified Dimensionality Reduced Data Items are selected as a Candidate Cluster for Enhancement. As one example, the purity threshold may be defined to be 99.05. In other embodiments the purity threshold may be different (90%, 95%, 99%, 99.9%, etc.).

As an example, the cluster purity factor may be determined for each cluster by:

$$cluster_{purity\ factor} = \frac{\max(num_{anomaly}, num_{normal})}{\text{number records in cluster}}$$

$$num_{anomaly} = \sum_{i=0}^{num\ records\ in\ cluster} \begin{cases} 1 & \text{if cluster type} = 'anomaly' \\ 0 & \text{otherwise} \end{cases}$$

$$num_{nomal} = \sum_{i=0}^{num\ records\ in\ cluster} \begin{cases} 1 & \text{if cluster type} = 'normal' \\ 0 & \text{otherwise} \end{cases}$$

If the cluster is identified as a candidate cluster for enhancement (YES at 1204), the associated classified dimensionality reduced dataset items are identified and the learned clustering model 1205 (1005 in FIG. 10; labeled "H") is applied at 1221, producing for each dataset item n predicted probabilities of assignment to the n possible clusters, where n represents the number of clusters selected during the cluster modelling process. The n predicted probabilities values range from between 0 to 1 and sum to 1.

Next, the associated historical anomaly dataset items from the original input historical anomaly dataset are identified and feature engineering (deriving engineered features) is optionally performed at 1222. Subsequently, the associated candidate cluster classified dimensionality reduced dataset items, n predicted probabilities, derived features, and target feature are combined, at 1223, producing the candidate cluster anomaly classification enhancement dataset.

Utilizing the candidate cluster anomaly classification enhancement dataset, the target feature is identified, and the remaining features of the candidate cluster anomaly classification enhancement dataset is used to train, at 1224, a supervised classification model classifying each candidate cluster anomaly classification enhancement data item as an anomaly or normal.

As an example, the supervised machine learning algorithm Gaussian Naive Bayes may be the predictive classification model learned for classifying each data item within each candidate cluster. An assumption of the Gaussian Naive Bayes algorithm is independence between features of the input dataset. This may be supported by the anomaly detection framework through selection of FastICA and Gaussian Mixture Model as the Feature Projection and Clustering algorithms respectively. For the FastICA algorithm the features of the output dimensionality reduced dataset are statistically independent. For Gaussian Mixture Model algorithm, the cluster probabilities output by the Gaussian Mixture model may be deemed independent when the probability of assignment to a cluster (component) is deemed to have met a required threshold (e.g., if probability of cluster assignment for a single component is greater than 80% for 90% of data points, the independence assumption is held).

The output components of the FAST ICA (the dimensionality reduced dataset), and predicted probabilities from the Gaussian Mixture Mode that are used to constitute the candidate cluster anomaly classification enhancement dataset have the property of independence between their output features. Therefore, the underlying pipeline this framework presents may enable the features of the candidate cluster anomaly classification enhancement dataset to meet the independence assumption required by the Gaussian Naïve Bayes algorithm. Thus, the Gaussian Naïve Bayes algorithm completes the binding, connecting the multiple components of the anomaly identification pipeline this framework solution represents.

In other embodiments other algorithms may be selected for the feature projection and clustering algorithms.

At 1225, after training at 1224, predictions from the supervised anomaly classification model are used to update the candidate cluster anomaly dataset items classification.

At 1206 it is determined whether all clusters have been processed. If not, the next cluster is retrieved and the process continues to 1203 and then applies the enhancement candidate cluster identification algorithm (at 1210) and determines if that next cluster is a candidate cluster (at 1204) and if it is a candidate, continues to the train candidate cluster anomaly classification enhancer 1220.

Once all clusters are processed, and predictions produced, the enhance classified dimensionality reduced dataset predictions are combined with anomaly classifications produced by non-enhanced clusters and the final anomaly classification dataset 1209 (labeled "Y") for the input historical anomaly dataset 1201 is produced.

As output a vector of Candidate Cluster Identifiers 1207 (labeled "J"), and n supervised anomaly classification models 1208 (labeled "K"), and the final anomaly classification dataset 1209 are produced.

FIG. 13 shows a diagram 1300 of applying a supervised anomaly cluster enhancement model, according to an embodiment. That is, applying the learned unsupervised clustering model 1305 (1005 in FIG. 10, labeled "H") and the supervised anomaly classification models 1306 (1208 in FIG. 12; labeled "K") to a new input dataset 1301. The process shown in the diagram 1200 may be performed by the Anomaly Cluster Enhancement 380 component described herein.

The Anomaly Cluster Enhancement 380 component takes the input dataset 1301 and the classified dimensionality reduced dataset 1302 (1106 in FIG. 11; labeled "S") as input for application. Utilizing the vector of identified candidate clusters 1303 (1207 in FIG. 12; labeled "J"), at 1310 the classified dimensionality reduced dataset is filtered to extract dimensionality reduced data items related to identified candidate clusters.

Anomaly Cluster Enhancement 380 component includes an Apply Candidate Cluster Anomaly Classification Enhancer 1320 component. For each identified candidate cluster, the associated classified dimensionality reduced dataset items are identified by the Apply Candidate Cluster Anomaly Classification Enhancer 1320 component and the learned clustering model 1305 (1005 in FIG. 10; labeled "H") is applied, at 1321, producing for each dataset item n predicted probabilities of assignment to the n possible clusters, where n represents the number of clusters selected during the cluster modelling process. As in the training phase, the n predicted probabilities values range from between 0 to 1 and sum to 1.

Optionally, at 1322 the associated input data items from the input dataset are identified and the same additional features as derived in the training stage are materialized. At 1323, the associated candidate cluster classified dimensionality reduced dataset items, n predicted probabilities, derived features are combined producing the candidate cluster anomaly classification enhancement dataset.

Then at 1324 utilizing the candidate cluster anomaly classification enhancement dataset as input, the learned supervised anomaly classification model 1306 (1208 in FIG. 12; labeled "K") is applied, classifying each candidate cluster anomaly classification enhancement data item as either an anomaly or normal.

At 1307 it is determined whether all candidate clusters have been processed by the Apply Candidate Cluster Anomaly Classification Enhancer 1320 component. If not, the next candidate cluster is retrieved and the process continues to 1304 and then to 1321 and so on.

Once all candidate clusters are processed, at 1330, candidate cluster anomaly dataset items classification are updated based on supervised anomaly classification model predictions. Then the classification produced, the enhance classified dimensionality reduced dataset classifications are combined with anomaly classifications of the untreated clusters and the final output of anomaly classifications 1308 (labeled "Z") for the input dataset produced with expected accuracy. Further features and advantages of the Anomaly Detection Framework include providing improved accuracy through the combination of the unsupervised clustering model and the supervised classification model while using fewer computing resources compared to deep learning techniques and other techniques that provide similar accuracy.

Example Hardware

Figure 14:
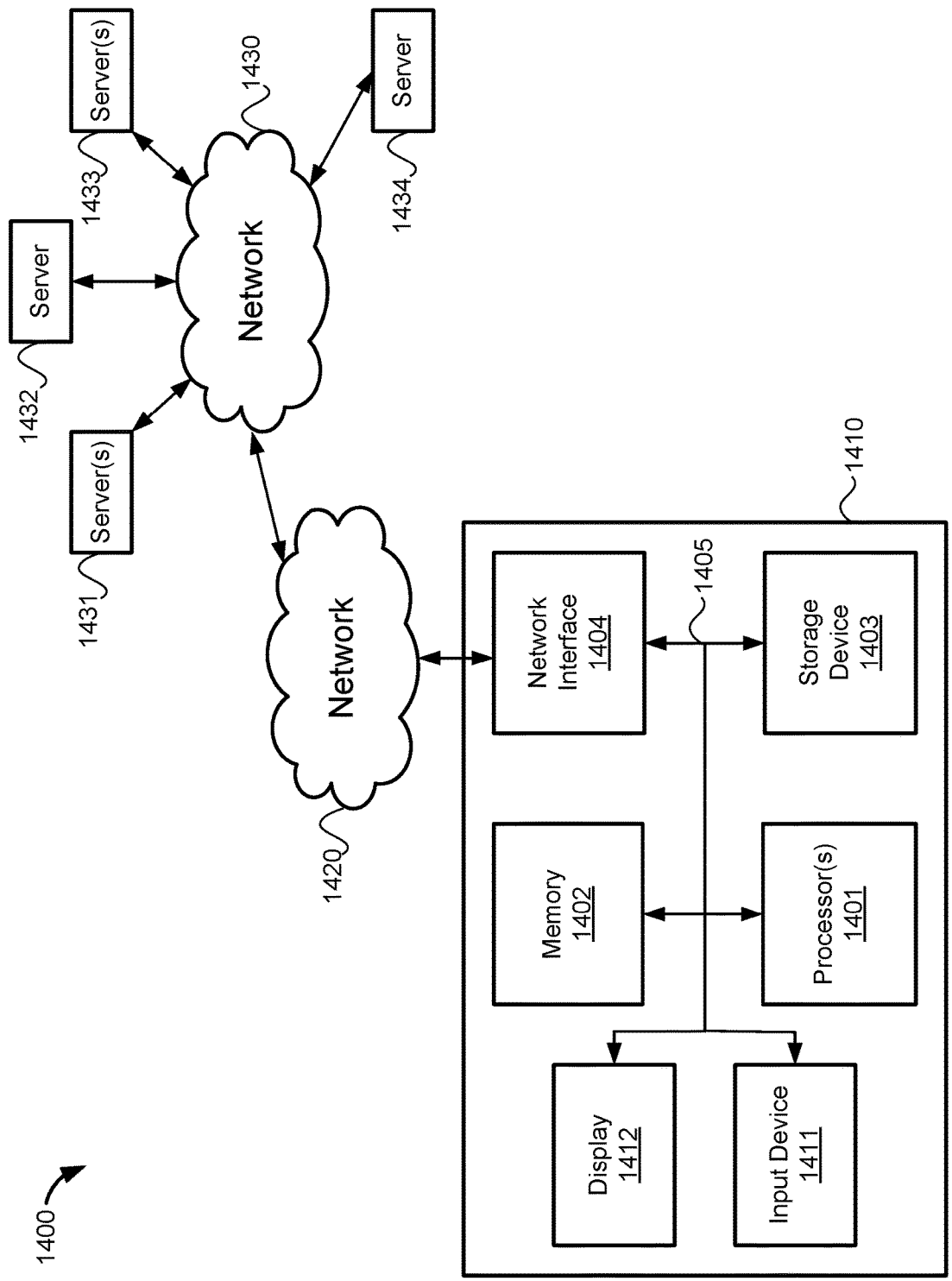
FIG. 14 shows a diagram of hardware of a special purpose computing machine for implementing systems and methods described herein.

FIG. 14 shows a diagram 1400 of hardware of a special purpose computing machine for implementing systems and methods described herein. The following hardware description is merely one example. It is to be understood that a variety of computers topologies may be used to implement the above described techniques. The hardware shown in FIG. 14 may be used to implement the computer systems and computer software (computer reprogram code) described herein.

The computer system 1410 includes a bus 1405 or other communication mechanism for communicating information, and one or more processor(s) 1401 coupled with bus 1405 for processing information. The computer system 1410 also includes a memory 1402 coupled to bus 1405 for storing information and instructions to be executed by processor 1401, including information and instructions for performing some of the techniques described above, for example. This memory may also be used for storing programs executed by processor(s) 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1403 may include source code, binary code, or software files for performing the techniques above, for example. Storage device and memory are both examples of non-transitory computer readable storage mediums.

The computer system 1410 may be coupled via bus 1405 to a display 1412 for displaying information to a computer user. An input device 1411 such as a keyboard, touchscreen, and/or mouse is coupled to bus 1405 for communicating information and command selections from the user to processor 1401. The combination of these components allows the user to communicate with the system. In some systems, bus 1405 represents multiple specialized buses, for example.

The computer system also includes a network interface 1404 coupled with bus 1405. The network interface 1404 may provide two-way data communication between computer system 1410 and a network 1420. The network interface 1404 may be a wireless or wired connection, for example. The network 1420 may be a local area network or an intranet, for example. The computer system 1410 can send and receive information through the network interface 1404, across the network 1420, to computer systems connected to the Internet 1430. Using the Internet 1430 the computer system 1410 may access data and features that reside on multiple different hardware servers 1431-1434. The servers 1431-1434 may be part of a cloud computing environment in some embodiments.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors;
one or more machine-readable medium coupled to the one or more processors and storing computer program code comprising sets of instructions executable by the one or more processors to:
determine a plurality of clusters of records by applying a historical anomaly dataset to a trained clustering model for determining whether a particular record is normal or an anomaly;
determine whether each cluster of the plurality of clusters is an anomaly-type cluster or a normal-type cluster, the determination of the anomaly-type based on a number of anomaly records in a given cluster, the determination of the normal-type based on the number of normal records in the given cluster;
update a plurality of labels for each of a plurality of records based on a particular record's cluster classification being the anomaly-type or the normal-type;
determine one or more non-pure clusters from among the plurality of clusters based on comparing the plurality of labels in a particular cluster to a predetermined purity threshold;
obtain a new dataset comprising one or more new records;
identify the particular cluster of the plurality of clusters that each of the new records belongs to by applying the new dataset to the trained clustering model; and
predict whether the new records belonging to non-pure clusters are an anomaly by applying the new records to a trained supervised machine learning model for the corresponding non-pure cluster that they belong to.

2. The computer system of claim 1, wherein the computer program code further comprises sets of instructions executable by the one or more processors to:
reduce a dimensionality of the historical anomaly dataset using a feature projection algorithm to obtain a reduced dimensionality historical anomaly dataset, wherein a training of the trained clustering model used the reduced dimensionality historical anomaly dataset.

3. The computer system of claim 1, wherein the computer program code further comprises sets of instructions executable by the one or more processors to:
predict that the new records belonging to pure clusters are an anomaly if they belong to an anomaly-type cluster.

4. The computer system of claim 1, wherein the trained clustering model is trained using a labeled historical anomaly dataset comprising categorical data, and wherein the computer program code further comprises sets of instructions executable by the one or more processors to:
identify one or more categorical features in the categorical data;
build a categorical data encoder for each of the one or more categorical features; and
transform values of the categorical data into numerical values using the categorical data encoders.

5. The computer system of claim 1, wherein the trained clustering model is trained using a labeled historical anomaly dataset comprising numerical data, and wherein the computer program code further comprises sets of instructions executable by the one or more processors to:
identify one or more numerical features in the numerical data;
build a data standardizer for each of the one or more numerical features; and transform values of the numerical data for each of numerical features to have a mean of zero and a variance of one.

6. The computer system of claim 1, wherein the computer program code further comprises sets of instructions executable by the one or more processors to:
derive engineered features for each of the one or more non-pure clusters.

7. The computer system of claim 1, wherein the trained clustering model is trained using a gaussian mixture modeling algorithm.

8. A non-transitory computer-readable medium storing computer program code comprising sets of instructions to:
determine a plurality of clusters of records by applying a historical anomaly dataset to a trained clustering model for determining whether a particular record is normal or an anomaly;
determine whether each cluster of the plurality of clusters is an anomaly-type cluster or a normal-type cluster, the determination of the anomaly-type based on a number of anomaly records in a given cluster, the determination of the normal-type based on the number of normal records in the given cluster;
update a plurality of labels for each of a plurality of records based on a particular record's cluster classification being the anomaly-type or the normal-type;
determine one or more non-pure clusters from among the plurality of clusters based on comparing the plurality of labels in a particular cluster a predetermined purity threshold;
obtain a new dataset comprising one or more new records;
identify the particular cluster of the plurality of clusters that each of the new records belongs to by applying the new dataset to the trained clustering model; and
predict whether the new records belonging to non-pure clusters are an anomaly by applying the new records to a trained supervised machine learning model for the corresponding non-pure cluster that they belong to.

9. The non-transitory computer-readable medium of claim 8, wherein the computer program code further comprises sets of instructions to:
reduce a dimensionality of the historical anomaly dataset using a feature projection algorithm to obtain a reduced dimensionality historical anomaly dataset, wherein a training of the trained clustering model used the reduced dimensionality historical anomaly dataset.

10. The non-transitory computer-readable medium of claim 8, wherein the computer program code further comprises sets of instructions to:
predict that the new records belonging to pure clusters are an anomaly if they belong to an anomaly-type cluster.

11. The non-transitory computer-readable medium of claim 8, wherein the trained clustering model is trained using a labeled historical anomaly dataset comprising categorical data, and wherein the computer program code further comprises sets of instructions to:
identify one or more categorical features in the categorical data;
build a categorical data encoder for each of the one or more categorical features; and
transform values of the categorical data into numerical values using the categorical data encoders.

12. The non-transitory computer-readable medium of claim 8, wherein the trained clustering model is trained using a labeled historical anomaly dataset comprising numerical data, and wherein the computer program code further comprises sets of instructions to:
identify one or more numerical features in the numerical data;
build a data standardizer for each of the one or more numerical features; and
transform values of the numerical data for each of numerical features to have a mean of zero and a variance of one.

13. The non-transitory computer-readable medium of claim 8, wherein the computer program code further comprises sets of instructions to:
derive engineered features for each of the one or more non-pure clusters.

14. The non-transitory computer-readable medium of claim 8, wherein the trained clustering model is trained using a gaussian mixture modeling algorithm.

15. A computer-implemented method, comprising:
determining a plurality of clusters of records by applying a historical anomaly dataset to a trained clustering model for determining whether a particular record is normal or an anomaly;
determining whether each cluster of the plurality of clusters is an anomaly-type cluster or a normal-type cluster, the determination of the anomaly-type based on a number of anomaly records in a given cluster, the determination of the normal-type based on the number of normal records in the given cluster;
updating a plurality of labels for each of a plurality of records based on a particular record's cluster classification being the anomaly-type or the normal-type;
determining one or more non-pure clusters from among the plurality of clusters based on comparing the plurality of labels in a particular cluster to a predetermined purity threshold;
obtaining a new dataset comprising one or more new records;
identifying the particular cluster of the plurality of clusters that each of the new records belongs to by applying the new dataset to the trained clustering model; and
predicting whether the new records belonging to non-pure clusters are an anomaly by applying the new records to a trained supervised machine learning model for the corresponding non-pure cluster that they belong to.

16. The computer-implemented method of claim 15, further comprising:
reducing a dimensionality of the historical anomaly dataset using a feature projection algorithm to obtain a reduced dimensionality historical anomaly dataset, wherein a training of the clustering model used the reduced dimensionality historical anomaly dataset.

17. The computer-implemented method of claim 15, further comprising:
predicting that the new records belonging to pure clusters are an anomaly if they belong to an anomaly-type cluster.

18. The computer-implemented method of claim 15, wherein the trained clustering model is trained using a labeled historical anomaly dataset comprising categorical data, the method further comprising:
identifying one or more categorical features in the categorical data;
building a categorical data encoder for each of the one or more categorical features; and
transforming values of the categorical data into numerical values using the categorical data encoders.

19. The computer-implemented method of claim 15, wherein the trained clustering model is trained using a labeled historical anomaly dataset comprising numerical data, the method further comprising:
- identifying one or more numerical features in the numerical data;
- building a data standardizer for each of the one or more numerical features; and
- transforming values of the numerical data for each of numerical features to have a mean of zero and a variance of one.

20. The computer-implemented method of claim 15, wherein the trained clustering model is trained using a gaussian mixture modeling algorithm.

* * * * *